(12) United States Patent
MacArthur et al.

(10) Patent No.: US 7,734,451 B2
(45) Date of Patent: Jun. 8, 2010

(54) SYSTEM, METHOD, AND COMPUTER PROGRAM FOR EARLY EVENT DETECTION

(75) Inventors: J. Ward MacArthur, Scottsdale, AZ (US); Wendy K. Foslien, Minneapolis, MN (US); Dinkar Mylaraswamy, Fridley, MN (US); Mohan N. Srinivasrao, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 782 days.

(21) Appl. No.: 11/583,219

(22) Filed: Oct. 18, 2006

(65) Prior Publication Data
US 2007/0088534 A1    Apr. 19, 2007

Related U.S. Application Data

(60) Provisional application No. 60/728,129, filed on Oct. 18, 2005.

(51) Int. Cl.
*G06F 17/10* (2006.01)
(52) U.S. Cl. .......................................... 703/2; 702/185
(58) Field of Classification Search ...................... 703/2
See application file for complete search history.

(56) References Cited

U.S. PATENT DOCUMENTS 5,592,402 A * 1/1997 Beebe et al. .................... 703/6
7,349,746 B2 * 3/2008 Emigholz et al. ............. 700/21
7,424,395 B2 * 9/2008 Emigholz et al. ........... 702/182
7,567,887 B2 * 7/2009 Emigholz et al. ........... 702/182
2006/0074598 A1 * 4/2006 Emigholz et al. ........... 702/185

OTHER PUBLICATIONS

Michael Bell et al., "Early Event Detection—A Prototype Implementation", 2003, Honeywell User Group 2003, 14 unnumbered pages.*
Michael Bell, Wendy Foslien, Early Event Detection—Results From a Prototype Implementation, 2005 AICHE Spring Nat'l Mtg, Apr. 2005, pp. 727-741, Atlanta, GA, USA.
Honeywell Product Guide 2004, [Online] 2004, Honeywell International Inc., Retrieved from the Internet: URL:http://www.kip.ictop.ru/honeywell/SYSTEMS/ExperionPKS....
Theodora Kourti, Process Analysis and Abnormal Situation Detection, IEEE Control Systems Mag. [Online], vol. 22, No. 5, Oct. 2002, pp. 10-25, URL:http://dx.doi.org/10.1109/MCS...

(Continued)

*Primary Examiner*—Paul L Rodriguez
*Assistant Examiner*—Russ Guill
(74) *Attorney, Agent, or Firm*—Munck Carter, LLP

(57) ABSTRACT

Various methods, devices, systems, and computer programs are disclosed relating to the use of models to represent systems and processes (such as manufacturing and production plants). For example, a method may include generating a first model and a second model using operating data associated with a system or process. The method may also include using the first and second models to predict one or more events associated with the system or process. The one or more events are predicted by generating one or more initial event predictions using the first model and adjusting the one or more initial event predictions using the second model. The first model may represent a Principal Component Analysis (PCA) model, and the second model may represent a Fuzzy Logic model.

21 Claims, 21 Drawing Sheets

OTHER PUBLICATIONS

Don Morrison et al., The Early Event Detection Toolkit, White Paper, WP-06-01-ENG, Honeywell International Inc., Jan. 2006, pp. 1-14.

Fuzzy Logic Toolbox 2.1 Design and Simulate Fuzzy Logic Systems, The Mathworks (Product Sheet), No. 8281v05, May 2004, pp. 1-2.

Model Predictive Control Toolbox 2—Develop Internal Model-Based Controllers for Constrained Multivariable Processes, The Mathworks (Prod. Sht), No. 8061v03, Mar. 2005, pp. 1-4.

Statistics Toolbox for use with Matlab Users Guide Version 2, The Mathworks Statistics Toolbox Users Guide, Jan. 1999, The Mathworks Inc.

Tony Chan, Rank Revealing QR Factorizations, Linear Algebra and its Applications, [Online], vol. 88-89, Apr. 1987, pp. 67-82, URL:http://dx.doi.org/10.1016/0024-3795....

* cited by examiner

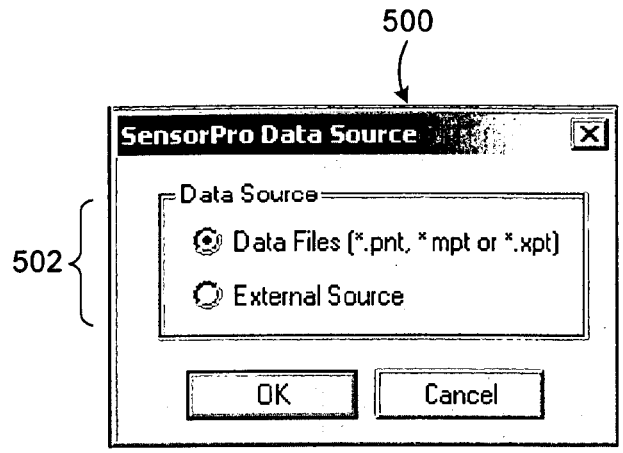
FIGURE 5
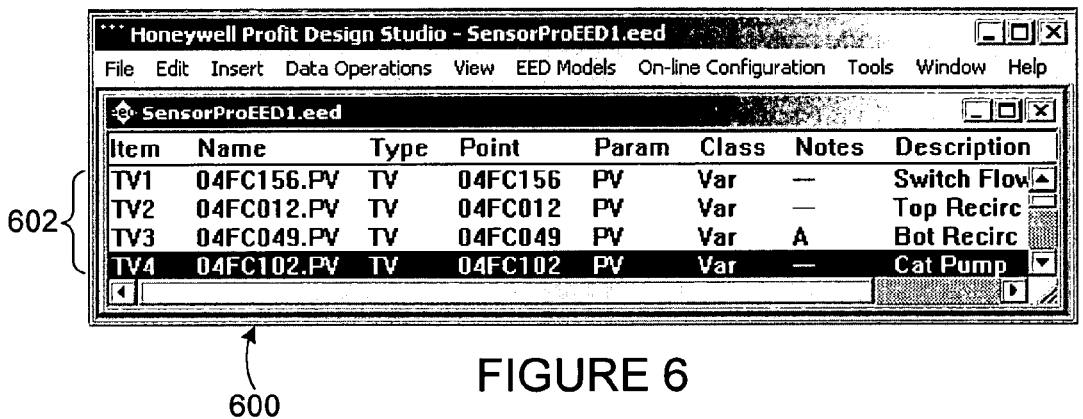
FIGURE 6
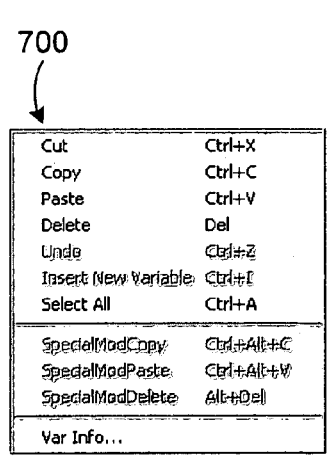 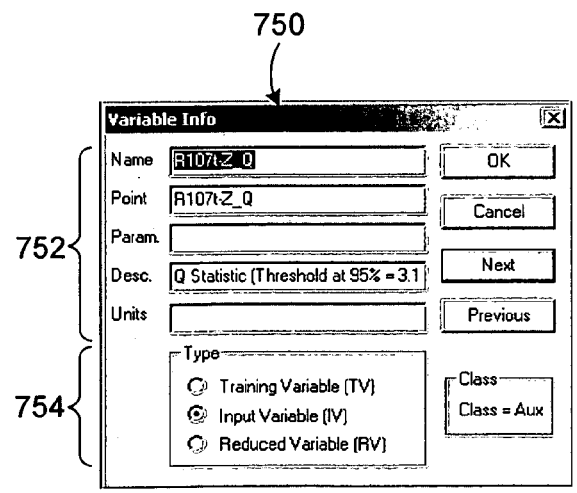
FIGURE 7A          FIGURE 7B

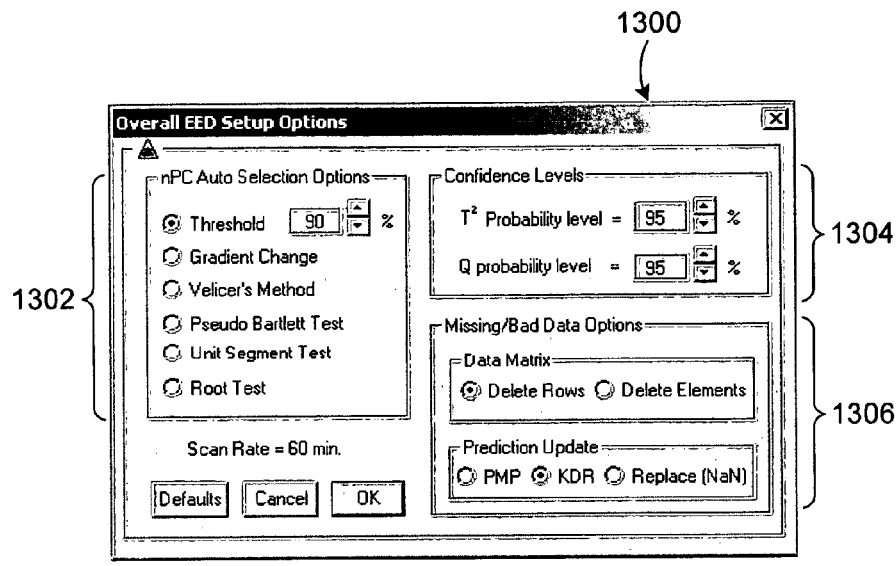
FIGURE 13
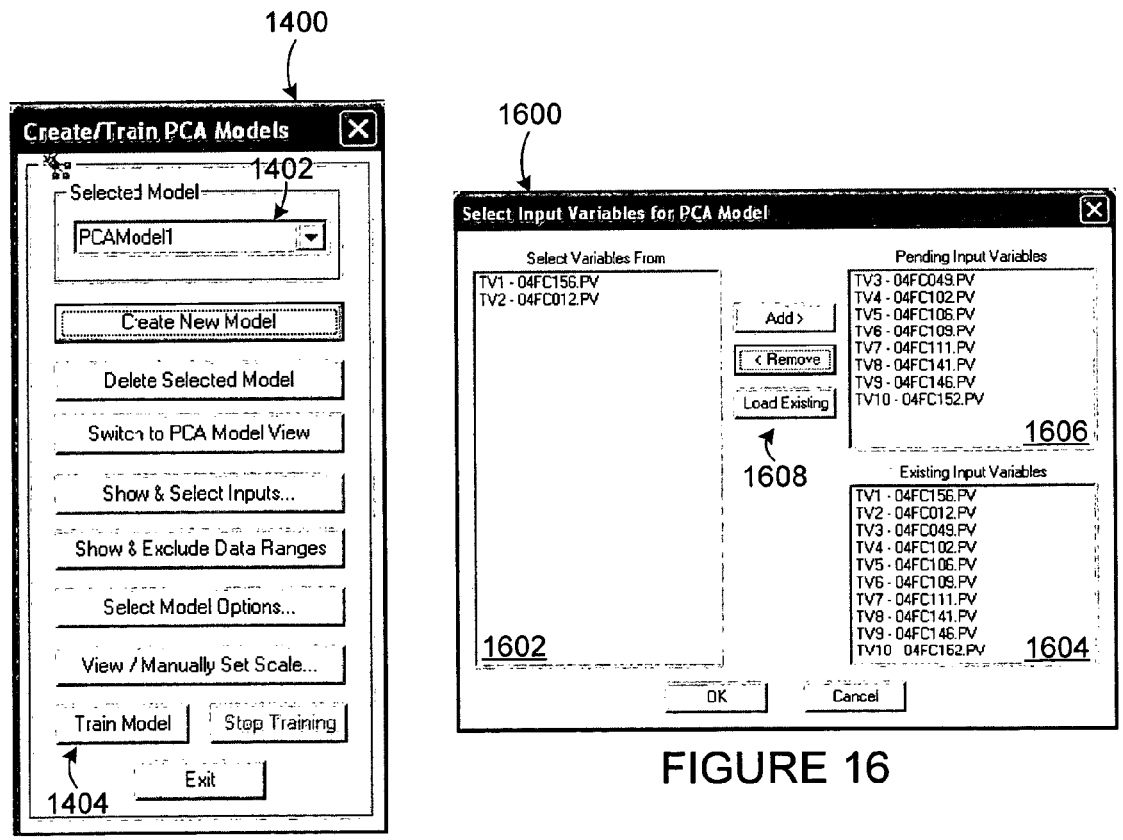
FIGURE 14
FIGURE 16

2270

2290

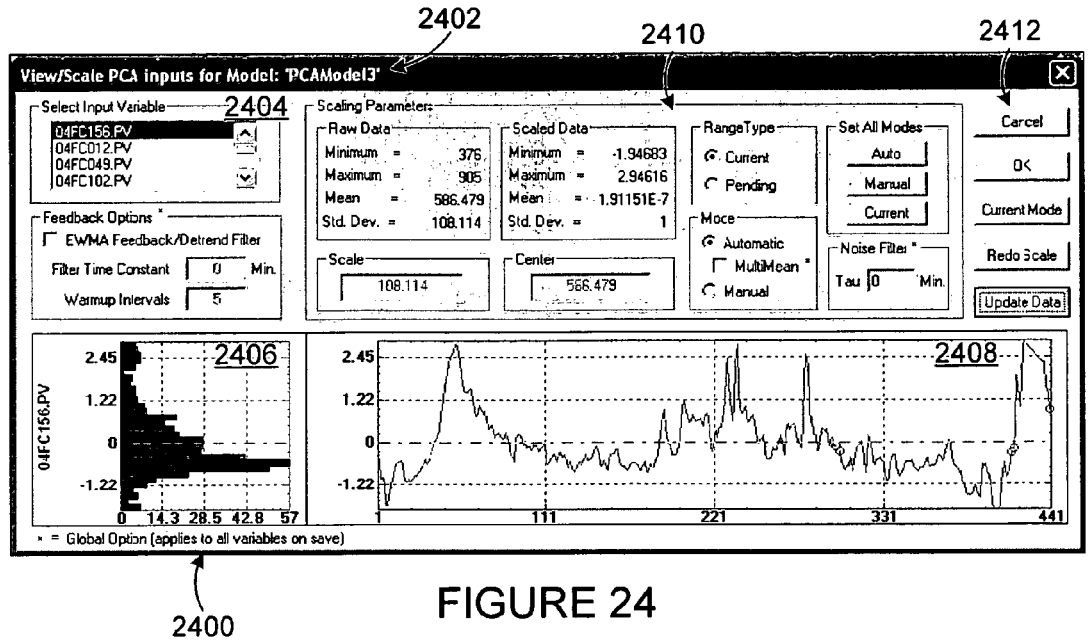
FIGURE 24
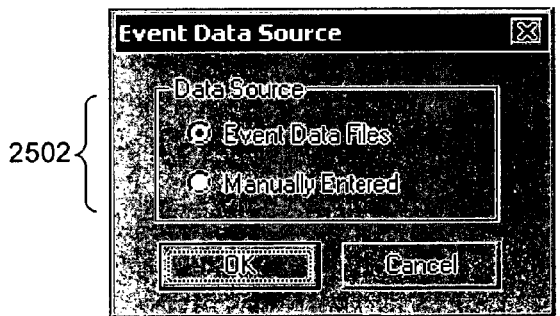
FIGURE 25
| EVENT_TYPES | | | | |
|---|---|---|---|---|
| Switch | | NONE | | 04FC012.PV, 04FC049.PV, 04FC102.PV, 04FC106.PV |
| | | | | |
| EVENT_DATA | | | | |
| Switch | 2/6/2001 18:00 | 2/8/2001 15:00 | 0 | |
FIGURE 26

SYSTEM, METHOD, AND COMPUTER PROGRAM FOR EARLY EVENT DETECTION

CROSS-REFERENCE TO RELATED APPLICATIONS

This application claims priority under 35 U.S.C. §119(e) to U.S. Provisional Patent Application No. 60/728,129 filed on Oct. 18, 2005, which is hereby incorporated by reference.

TECHNICAL FIELD

This disclosure relates generally to predictive modeling and control systems. More specifically, this disclosure relates to a system, method, and computer program for early event detection.

BACKGROUND

Many systems and processes in science, engineering, business, and other settings can be characterized by the fact that many different inter-related parameters contribute to the behavior of the system or process. It is often desirable to determine values or ranges of values for some or all of these parameters. This may be done, for example, so that parameter values or value ranges corresponding to beneficial behavior patterns of the system or process (such as productivity, profitability, or efficiency) can be identified. However, the complexity of most real world systems generally precludes the possibility of arriving at such solutions analytically.

Many analysts have therefore turned to predictive models to characterize and derive solutions for these complex systems and processes. A predictive model is generally a representation of a system or process that receives input data or parameters (such as those related to a system or model attribute and/or external circumstances or environments) and generates output indicative of the behavior of the system or process under those parameters. In other words, the model or models may be used to predict the behavior or trends of the system or process based upon previously acquired data.

SUMMARY

This disclosure provides a system, method, and computer program for early event detection.

In a first embodiment, a method includes generating a first model and a second model using operating data associated with a system or process. The method also includes using the first and second models to predict one or more events associated with the system or process. The one or more events are predicted by generating one or more initial event predictions using the first model and adjusting the one or more initial event predictions using the second model.

In a second embodiment, a method includes generating multiple first output signals using multiple first models representing a system or process. The method also includes normalizing the first output signals using one or more second models to produce multiple normalized second output signals. In addition, the method includes combining the normalized second output signals.

In a third embodiment, a method includes identifying at least one invalid data element in data associated with a system or process. The method also includes estimating a value for one or more of the invalid data elements using at least some valid data elements in the data associated with the system or process. The estimating includes performing a rank revealing QR factorization of a 2-norm known data regression problem. In addition, the method includes using the estimated value for one or more of the invalid data elements to predict one or more events associated with the system or process.

In a fourth embodiment, a method includes presenting a graphical display to a user. The graphical display plots a range of data values for one or more variables associated with a model of a system or process. The method also includes receiving from the user, through the graphical display, an identification of one or more portions of the data range. In addition, the method includes training the model without using any identified portions of the data range.

In a fifth embodiment, a method includes receiving information identifying multiple first events associated with a system or process. The method also includes generating at least one model using operating data associated with the system or process. The operating data does not include operating data associated with the identified events. The method further includes testing the at least one model by comparing second events predicted using the at least one model to the first events.

In a sixth embodiment, a method includes presenting a graphical display to a user. The graphical display includes a first plot identifying an error associated with a model representing a system or process and a second plot associated with one or more variables contributing to the error. The method also includes receiving input from the user identifying how the one or more variables associated with the second plot are selected.

In a seventh embodiment, a method includes configuring a model representing a system or process in an off-line module for on-line use. The off-line module is operable to create the model, and the configuring occurs automatically and is specified completely within the off-line module. The method also includes providing the configured model to an on-line module for use in predicting events associated with the system or process.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 3 through 43 illustrate an example tool for early event detection.

DETAILED DESCRIPTION

Figure 1:
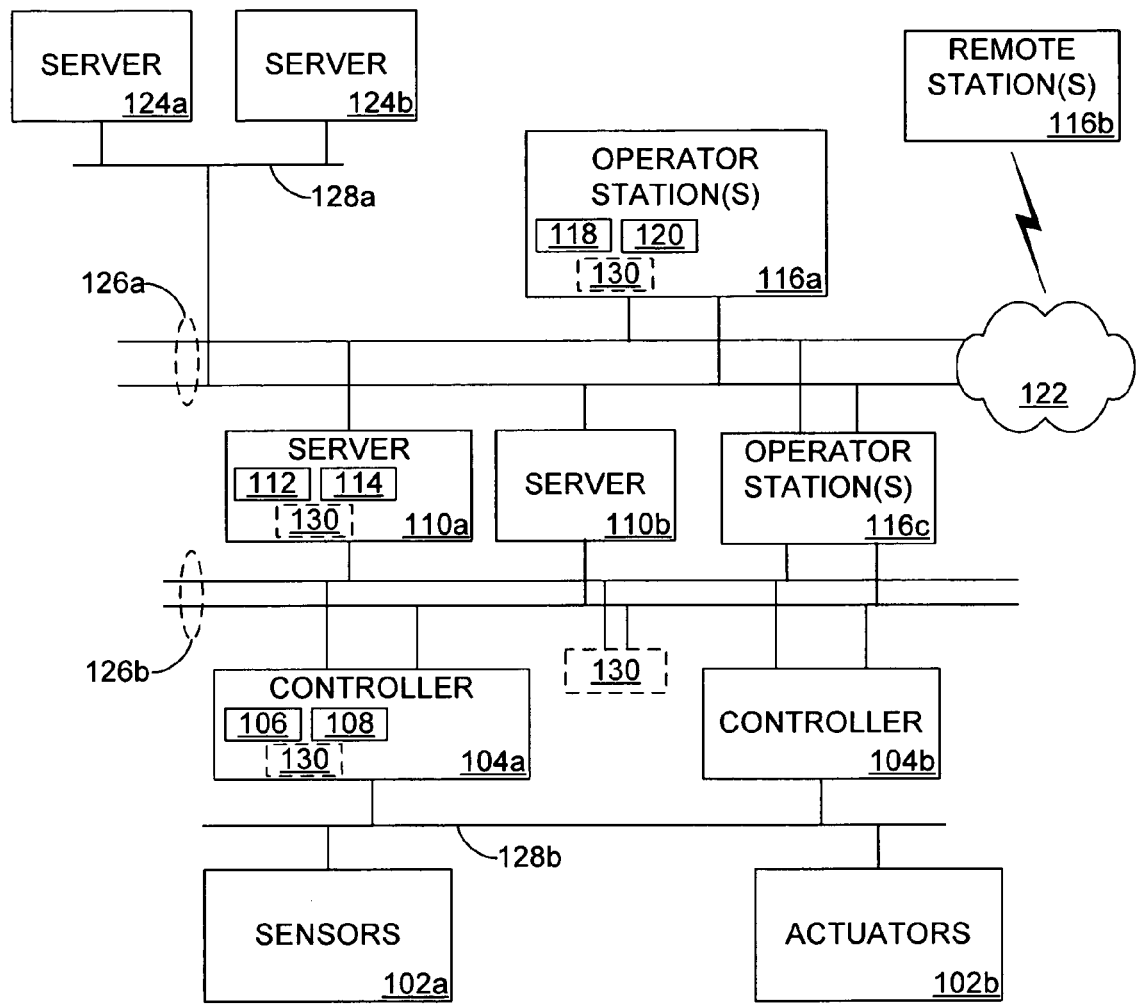
FIG. 1 illustrates an example system supporting early event detection.

FIG. 1 illustrates an example system 100 supporting early event detection. In particular, FIG. 1 illustrates a process control system for controlling a manufacturing or production process and that supports early event detection. The embodiment of the system 100 shown in FIG. 1 is for illustration only. Other embodiments of the system may be used without departing from the scope of this disclosure.

In this example embodiment, the system 100 includes various elements that facilitate production of at least one product. These elements include one or more sensors 102a and one or more actuators 102b. The sensors 102a and actuators 102b represent components in a process is or production system that may perform any of a wide variety of functions. For example, the sensors 102a could measure a wide variety of characteristics in the system 100, such as temperature, pressure, or flow rate. Also, the actuators 102b can perform a wide variety of operations that alter the characteristics being monitored by the sensors 102a. As examples, the actuators 102b could represent heaters, motors, or valves. The sensors 102a and actuators 102b could represent any other or additional components in any suitable process or production system. Each of the sensors 102a includes any suitable structure for measuring one or more characteristics in a process, production, or other system. Each of the actuators 102b includes any suitable structure for operating on or affecting a change in at least part of a process, production, or other system.

Two controllers 104a-104b are coupled to the sensors 102a and actuators 102b. The controllers 104a-104b may, among other things, use the measurements from the sensors 102a to control the operation of the actuators 102b. For example, the controllers 104a-104b could be capable of receiving measurement data from the sensors 102a and using the measurement data to generate control signals for the actuators 102b. Each of the controllers 104a-104b includes any hardware, software, firmware, or combination thereof for interacting with the sensors 102a and controlling the actuators 102b. The controllers 104a-104b could, for example, represent multi-variable controllers or other types of controllers that implement control logic (such as logic associating sensor measurement data to actuator control signals) to operate. In this example, each of the controllers 104a-104b includes one or more processors 106 and one or more memories 108 storing data and instructions used by the processor(s) 106. As a particular example, each of the controllers 104a-104b could represent a computing device running a MICROSOFT WINDOWS operating system.

Two servers 110a-110b are coupled to the controllers 104a-104b. The servers 110a-110b perform various functions to support the operation and control of the controllers 104a-104b, sensors 102a, and actuators 102b. For example, the servers 110a-110b could log information collected or generated by the sensors 102a or controllers 104a-104b, such as measurement data from the sensors 102a. The servers 110a-110b could also execute applications that control the operation of the controllers 104a-104b, thereby controlling the operation of the actuators 102b. In addition, the servers 110a-110b could provide secure access to the controllers 104a-104b. Each of the servers 110a-110b includes any hardware, software, firmware, or combination thereof for providing access to or control of the controllers 104a-104b. In this example, each of the servers 110a-110b includes one or more processors 112 and one or more memories 114 storing data and instructions used by the processor(s) 112. As a particular example, each of the servers 110a-110b could represent a computing device running a MICROSOFT WINDOWS operating system.

One or more operator stations 116a-116b are coupled to the servers 110a-110b, and one or more operator stations 116c are coupled to the controllers 104a-104b. The operator stations 116a-116b represent computing or communication devices providing user access to the servers 110a-110b, which could then provide user access to the controllers 104a-104b (and possibly the sensors 102a and actuators 102b). The operator stations 116c represent computing or communication devices providing direct user access to the controllers 104a-104b. As particular examples, the operator stations 116a-116c could allow users to review the operational history of the sensors 102a and actuators 102b using information collected by the controllers 104a-104b and/or the servers 110a-110b. The operator stations 116a-116c could also allow the users to adjust the operation of the sensors 102a, actuators 102b, controllers 104a-104b, or servers 110a-110b. Each of the operator stations 116a-116c includes any hardware, software, firmware, or combination thereof for supporting user access and control of the system 100. In this example, each of the operator stations 116a-116c includes one or more processors 118 and one or more memories 120 storing data and instructions used by the processor(s) 118. In particular embodiments, each of the operator stations 116a-116c could represent a computing device running a MICROSOFT WINDOWS operating system.

In this example, at least one of the operator stations 116b is remote from the servers 110a-110b. The remote station is coupled to the servers 110a-110b through a network 122. The network 122 facilitates communication between various components in the system 100. For example, the network 122 may communicate Internet Protocol (IP) packets, frame relay frames, Asynchronous Transfer Mode (ATM) cells, or other suitable information between network addresses. The network 122 may include one or more local area networks (LANs), metropolitan area networks (MANs), wide area networks (WANs), all or a portion of a global network such as the Internet, or any other communication system or systems at one or more locations.

In this example, the system 100 includes two additional servers 124a-124b. The servers 124a-124b execute various applications to control the overall operation of the system 100. For example, the system 100 could be used in a processing or production plant or other facility, and the servers 124a-124b could execute applications used to control the plant or other facility. As particular examples, the servers 124a-124b could execute applications such as enterprise resource planning (ERP), manufacturing execution system (MES), or any other or additional plant or process control applications. Each of the servers 124a-124b includes any hardware, software, firmware, or combination thereof for controlling the overall operation of the system 100.

As shown in FIG. 1, the system 100 includes various redundant networks 126a-126b and single networks 128a-128b that support communication between components in the system 100. Each of these networks 126a-126b, 128a-128b represents any suitable network or combination of networks facilitating communication between components in the system 100. The networks 126a-126b, 128a-128b could, for example, represent Ethernet networks, electrical signal networks (such as HART or FOUNDATION FIELDBUS networks), pneumatic control signal networks, or any other or additional type of network(s).

In one aspect of operation, the system 100 includes or supports one or more early event detectors 130. An early event detector 130 is capable of assisting in early event detection, which generally involves analyzing data associated with a system or process to facilitate early warning of situations that appear abnormal in a statistical sense. This may be useful, for example, in identifying possible problems associated with the system or process. As a particular example, early event detection may involve analyzing measurement data from the sensors 102a or control signals provided to the actuators 102b in order to identify equipment malfunctions or other problems in a manufacturing or production plant.

In some embodiments, the early event detector 130 represents a Multi-Variate Statistical Analysis (MVSA) tool that supports the creation of one or more statistical models for use in early event detection. For example, the tool may enable the interactive creation of one or more statistical models based on input from one or more users. The models can then be used in a stand-alone manner or in conjunction with the early event detector 130 or another component of the system 100 to perform the actual event detection. The models produced by the early event detector 130 can represent any suitable models, such as linear and non-linear static statistical models, first principles models, dynamic statistical models, and Partial Least Squares (PLS) statistical models. As an example embodiment, the early event detector 130 may represent an MVSA tool that creates statistical models based on operating data associated with a manufacturing or production plant. These models may represent the plant in its normal state and can be used for detecting changes in plant operating characteristics. Also, the early event detector 130 may include an on-line module or component and an off-line module or component. The off-line module creates, trains, and tests the statistical models, and a selected set of models can seamlessly be exported to the on-line module for event detection and analysis. The on-line and off-line modules may reside on different components in the system 100.

In particular embodiments, the early event detector 130 may support the creation and use of multiple types of models. The models can be generated based on normal operating data associated with a system or process being modeled. The early event detector 130 may also support regression tools that provide statistics and metrics to provide a meaningful interpretation of the models' performance. This information can be used to compare and contrast different models under different conditions.

In these embodiments, parameters or variables associated with the statistical models may be categorized based on class and type. For example, variables can be categorized into "Var" and "Aux" classes. Variables in the "Var" class may represent variables that can be used for regression and that implicitly define distinct rows or columns in model matrices. Variables of the "Aux" class may represent variables that provide a permanent home for data but that do not appear as model variables. Variables of one class can be converted to variables of the other class and vice versa, and both classes of variables can be exported for use in other applications. Also, the variable types can include training variables and input variables. Training variables may represent output variables, which represent the result of a combination of one or more other variables and may be considered as dependent variables. Input variables may be considered as inputs to a model, may be correlated with other inputs or disturbances, may be considered as outputs of some upstream process, and may or may not be considered independent. While the distinction between inputs and outputs may be relevant for causal models or other types of models, it may have no bearing with respect to other statistical models generated or used by the early event detector 130.

Various types of models can be generated or used by the early event detector 130. For example, the early event detector 130 may support a statistical model for modeling the behavior of a system and a post-processor (another model) for modifying the output of the statistical model. As particular examples, the early event detector 130 may support Principal Component Analysis (PCA) models, Fuzzy Logic models, and Early Event Detection (EED) models. PCA models are an example of a statistical engine of the early event detector 130. The Fuzzy Logic models may be used as post-processors to normalize, shape, and tune the results of the PCA models. As an example, a PCA model may make one or more initial event predictions, and a Fuzzy Logic model may tune the initial event predictions. The EED models may represent shells or wrappers used to wrap the PCA and Fuzzy Logic models. Since one function of the early event detector 130 may include the generic detection of any abnormal conditions, a set of "normal" data can be defined and used to establish a PCA model-Fuzzy Logic model combination that defines the normal state of a system or process. Wrapped models can be systematically evaluated by performing cross validation tests where the wrapped (PCA and Fuzzy Logic models) are used on alternate sets of data not used in the original training set. Both normal and abnormal data could be contained in the cross validation data. When runtime or test conditions differ significantly from those conditions defined as normal, the process or system can be flagged as being in an abnormal state.

In addition, information used to tune and test the models may include "events." An event may represent a condition of the process or system known to have transpired during one or more periods of time. Event types may be user-definable, and multiple instances of an event type can be graphically or manually entered (such as through a text file). Annotations and contributing variables can be associated with each instance of an event type. Models generated by the early event detector 130 may be tested by determining whether the models accurately detect known events.

Depending on the implementation, there may be no inherent limitations to problem size, meaning any number of training variables and input variables can be accommodated by the early event detector 130. Also, no restrictions may be placed on data size or on the number of models, and system models may have any number of components. Only computer speed and memory resources (such as random access memory) may limit the application. Further, the early event detector 130 may be integrated into other components (such as PROFIT DESIGN STUDIO from HONEYWELL INTERNATIONAL INC.), and all data operations (including import and export operations) may be directly available to the early event detector 130. Overall, the early event detector 130 may function to provide a toolset for detecting, localizing, and ultimately assisting in the prevention of abnormal situations in a processing plant or other system or process.

The early event detector 130 could represent an application executed in or other logic supported by the system 100, such as in one or more servers 110a-110b or operator stations 116a-116c. The early event detector 130 could also represent a hardware or other module implemented as a stand-alone unit. The early event detector 130 could further be implemented in a controller or implemented in any other suitable manner. The early event detector 130 may include any hardware, software, firmware, or combination thereof for generating and/or using statistical and other models (such as post-processor models) for identifying statistically abnormal situations. Additional details regarding the operation of the early event detector 130 are shown in the remaining figures, which are described below.

Although FIG. 1 illustrates one example of a system 100 supporting early event detection, various changes may be made to FIG. 1. For example, the system could include any number of sensors, actuators, controllers, servers, operator stations, networks, and early event detectors. Also, the makeup and arrangement of the system 100 is for illustration only. Components could be added, omitted, combined, or placed in any other suitable configuration according to particular needs. In addition, FIG. 1 illustrates one operational environment in which early event detection can be used. The early event detection mechanism could be used in any other suitable device or system (whether or not that device or system is related to a production or manufacturing plant).

Figure 2A:
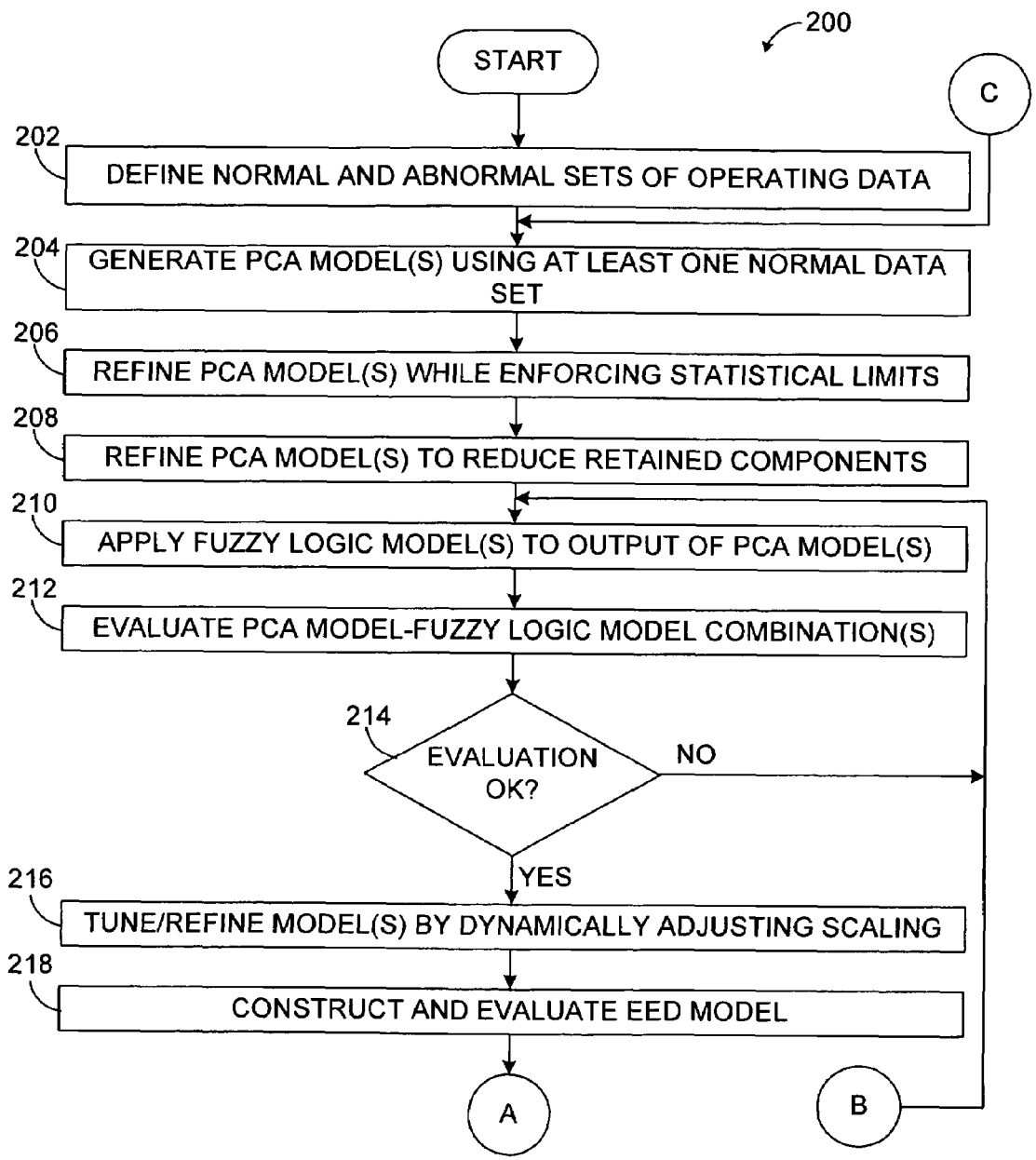
FIGS. 2A and 2B illustrate an example method for early event detection.
Figure 2B:
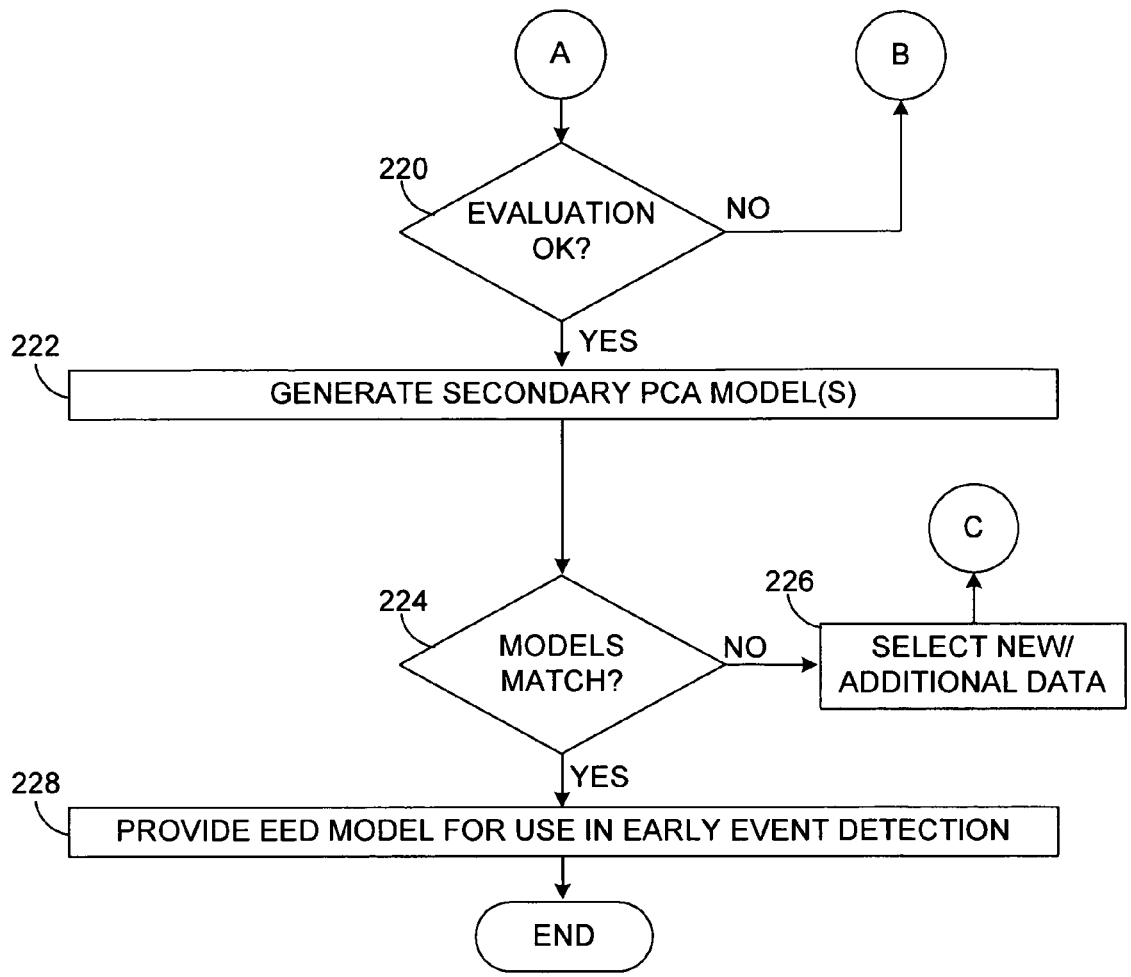

FIGS. 2A and 2B illustrate an example method 200 for early event detection. The method 200 shown in FIGS. 2A and 2B is for illustration only. Other embodiments of the method 200 may be used without departing from the scope of this disclosure. Also, for ease of explanation, the method 200 is described with respect to the early event detector 130 operating in the system 100 of FIG. 1. The method 200 could be used in any other suitable device or system.

At step 202, normal sets of operating data and abnormal sets of operating data associated with a system or process are defined. This can include analyzing the measurement data from the sensors 102a and the control signals provided to the actuators 102b to identify periods of normal and abnormal operation. This may be done manually or automatically and may be based on domain expertise, or expertise related to a particular system or process.

At step 204, one or more PCA models are generated using at least one of the normal data sets. Any suitable technique or techniques could be used to generate the PCA models, such as by receiving user input defining the models. This step may also include refining a scaling of the PCA models based on a scaled distribution. The sets of normal operating data used to generate the PCA models may be referred to as "training sets."

At step 206, the PCA models are refined while one or more statistical limits are enforced. For example, this may include refining the PCA models while keeping the percentage of time that one or more statistics exceed their statistical limits below a threshold. The statistics could represent Q and $T^2$ statistics, and the percentage of time could represent ten percent. The Q statistic is generally associated with an error related to a model. The $T^2$ statistic is generally associated with a variability of a model for a given system or process.

At step 208, the PCA models are refined again to reduce or minimize the number of principal components retained in the models. This step may include reducing the number of principal components while ensuring an adequate level of certainty in the models.

At step 210, one or more Fuzzy Logic models are used to tune the output of one or more PCA models. This step could include adjusting a membership function and a digital latch associated with a Fuzzy Logic model to provide adequate performance over normal operating data.

At step 212, the results of a PCA model-Fuzzy Logic model combination are evaluated to determine if the model combination is acceptable. This may include evaluating the PCA model-Fuzzy Logic model combination using a normal operating data set that was not used in the training set for the PCA model and the Fuzzy Logic model. This step can be referred to as "cross validation." If the results are not acceptable at step 214, the process returns to step 210.

At step 216, one or more of the models are further tuned or refined to filter out unwanted information by dynamically adjusting mean values or "centers" of scaling operations applied to each input variable in the model. This could be done using an Exponentially Weighted Moving Average (EWMA) filter. Also, a single three-state mode switch could be used that allows for seamless transitions during major transitions in the input variables by effectively modify the filter characteristics to provide slower or faster response depending on the current need. The adjustments can be made in a "bumpless" manner.

At step 218, an EED model is constructed and evaluated using normal and abnormal data. This may include testing the PCA model-Fuzzy Logic model combination using both normal and abnormal operating data sets. The evaluation may determine whether the EED model correctly predicts critical events defined in the normal and abnormal data sets with an acceptable false alarm/missed alarm rate. If the results of the evaluation are not acceptable at step 220, the process again returns to step 210.

At step 222, one or more secondary PCA models are generated. This may include using the same technique described above with respect to steps 204-208. These secondary PCA models may be generated using normal data sets not used as training sets in the development of the original PCA models. The original PCA models and the secondary PCA models are compared and a determination is made as to whether the models match at step 224. If the statistical results of the different models are not comparable, the original PCA models may not be representative of the "normal" system or process being modeled. New or additional data (such as different normal/abnormal data sets or more information-rich data) is selected at step 226, and the process returns to step 204. When multiple PCA models are comparable, the models can be considered representative, and the resultant EED model(s) can be exported or otherwise provided for use at step 228, such as by exporting the model to the on-line component of the early event detector 130.

The following description sets forth additional details of one specific implementation of the method 200 shown in FIGS. 2A and 2B. More specifically, the following description provides a mathematical basis for various operations performed in the method 200 by the early event detector 130. Various functions described below are also shown in greater detail in FIGS. 3 through 43, which are also described below. The following description is for illustration and explanation of one specific implementation of the method 200 and is not meant to limit the scope of this disclosure.

When a large number of variables are present in a system or process, it is sometime possible to simplify the analysis of the system or process by reducing the variables to a subset of linear combinations. This subset is sometimes referred to as a "subspace" of the original set of variables. That is, the original variables can be thought of as projecting to a subspace by means of a particular transformation. Principal component analysis or "PCA" is a popular way to achieve this reduction in dimensions by projecting a set of inputs into a subspace of reduced dimension. The subspace defines the "reduced variables" that are used for analyzing different types of models. The information loss associated with projection is quantifiable and can be controlled by the user.

To create a PCA model, the following information can be specified. First, a list of potential input variables can be defined. The entire set of available inputs can be chosen, or a subset of variables can be selected. Second, a method for specifying acceptable information loss can be defined, which helps to identify the number of principal components to be retained (and hence the dimension of the subspace). Ideally, the minimum subspace associated with a specified level of acceptable information loss can be identified.

In some embodiments, the early event detector 130 may be designed to generate and analyze PCA models based on variance representations. Here, some reduced order subspace is defined that captures a definable amount of process variation (variance). This can involve computation of a data matrix X, which has a rank r and can be represented as the sum of r rank−1 matrices. The number of columns in matrix X (denoted $n_c$) may correspond to the number of input variables. The number of rows in matrix X (denoted $n_r$) may correspond to the number of data samples of each input variable.

In some cases, the number of rows in matrix X is greater than the number of columns. In this case, the matrix X is sometimes referred to as being "thin," and a covariance matrix S of the data can be formulated as:

$$S = \frac{X^T X}{n_r - 1} = \begin{bmatrix} s_1^2 & \cdots & s_{1,n_c}^2 \\ s_{2,1}^2 & \ddots & \vdots \\ \vdots & \cdots & s_{n_c}^2 \end{bmatrix} \qquad (1)$$

where $s_i^2$ represents the variance of the $i^{th}$ variable, and $s_{i,j}^2$ represents the covariance between the $i^{th}$ and $j^{th}$ variables ($i \neq j$). As an example, consider a case where $n_r > n_c$ and matrix X is a 90,000×100 matrix. The singular value decomposition (SVD) of $X^T X$ can be applied to a 100×100 matrix and given by:

$$X^T X = (U\Sigma V^T)^T U\Sigma V^T = V\Lambda V^T \quad \lambda_i = \sigma_i^2. \qquad (2)$$

As a result, the SVD of $X^T X$ may yield a left singular vector equal to the right singular vector of the SVD of X. Also, the right singular vector of the SVD of $X^T X$ may be identical to the right singular vector of the SVD of X. Because of this, the following can the obtained:

$$U^{X^T X} = V^X \qquad (3)$$

$$V^{X^T X} = V^X \qquad (4)$$

$$\sigma_i^{X^T X} = \sigma_i^{2^X}. \qquad (5)$$

The PCA calculations in terms of the covariance matrix S can be expressed as:

$$U\Sigma V^T = S = \frac{X^T X}{n_r - 1} \qquad (6)$$

$$P = V(:, 1:n_{PC}) \qquad (7)$$

$$Z = XP \qquad (8)$$

where $n_{PC}$ represents the number of retained principal components.

In other cases, the number of columns in matrix X is greater than the number of rows. In this case, the matrix X is sometimes referred to as being "fat," and the covariance matrix S may not be scaled by the number of data rows. Here, the covariance matrix S can be formulated as:

$$S = XX^T. \qquad (9)$$

As an example, consider a case where matrix X is a 100×90,000 matrix. The following can then be obtained:

$$XX^T = U\Sigma V^T (U\Sigma V^T)^T = U\Sigma^2 U^T. \qquad (10)$$

Again, the resultant matrix could be a 100×100 matrix, and the SVD on the result may yield a left singular vector of $XX^T$ that is identical to the left singular vector of X. Also, the right singular vector may be the same as the left singular vector of X. As a result, the following can be obtained:

$$U^{XX^T} = U^X \qquad (11)$$

$$V^{XX^T} = U^X. \qquad (12)$$

The right singular vectors of X can be obtained by multiplying these expressions by $X^T$, which gives:

$$X^T V^{XX^T} = (U\Sigma V^T)^T V^{XX^T} = V^X \Sigma^T. \qquad (13)$$

This shows that $X^T V^{XX^T}$ is a matrix whose columns are scalar multiples of the desired singular vectors. To obtain the actual singular vectors, each column could be scaled as follows:

$$U\Sigma V^T = S = XX^T \qquad (14)$$

$$V = X^T V^T \qquad (15)$$

$$V(:, i) = V(:, i)/\sqrt{\sigma_i} \qquad (16)$$

$$P = V(:, 1:n_{PC}) \qquad (17)$$

$$Z = XP. \qquad (18)$$

PCA solutions for the "thin" and "fat" problems are provided in Equations (6)-(8) and (14)-(18), respectively. In these expressions, $\Sigma$ represents a singular value matrix whose diagonal elements are either the corresponding singular values or zero, and V represents a matrix of right singular vectors (which are orthonormal). In some embodiments, all singular values and singular vectors are stored by the early event detector 130 (irrespective of the current value of $n_{PC}$), and all other information (such as scores and statistics) can be generated on demand. Both the "fat" and "thin" problems can be accommodated in the base PCA calculations, and invalid data (such as bad or missing values or "NaN") can be accommodated directly in the PCA calculations. An efficient covariance calculation can be used in the formulation of the covariance matrix S, such as a utility function that provides for "lagged inputs" and is accomplished using a fast correlation update algorithm that is analytically rigorous and that fully exploits symmetry and the Toeplitz structure for auto-correlated data.

It can be shown that the singular values of the covariance matrix S are equal to the eigenvalues of the same matrix (where $\sigma_i$ is the $i^{th}$ singular value of X, and $\lambda_i$ is the $i^{th}$ eigenvalue of $X^T X$). It can also be shown that the summation of the singular values equals the total cumulative variance. The proportion of variance attributable to an individual principal component can therefore by given as:

$$\bar{v}_i = \frac{\sigma_i}{Tr(\Sigma)}. \qquad (19)$$

Also, the cumulative variance explained (or captured) through the $i^{th}$ singular value (principal component) can be expressed as:

$$C_v^i = \frac{Tr(\Sigma)_i}{Tr(\Sigma)}. \qquad (20)$$

The actual variance attributable to the $i^{th}$ principal component can be expressed as:

$$v_i = \sigma_i \qquad (21)$$

and the proportion of the variance of the $i^{th}$ variable that is accounted for by the $j^{th}$ principal component can be given by:

$$\bar{v}_{i,j} = \frac{\sigma_j V_{i,j}^2}{s_i^2}. \qquad (22)$$

Once a PCA model has been defined, the number of principal components in the model can be reduced. The determination of the value of $n_{PC}$ can be manual or automated, and the method of automation could be based on a trade-off between accuracy (the representation of the variance in the data) and complexity (the size of the subspace). The following represents various techniques for determining the value of $n_{PC}$. In a first "threshold" technique, the number of principal components to be retained ($n_{PC}$) is based on the proportion of cumulative variance captured by the retained principal components. As shown previously, $S_i^2$ represents the variance of the $i^{th}$ principal component. For a threshold test, the user may specify the threshold for the value of $C_v^i$. The first value of i at which the value of $C_v^i$ meets or exceeds the specified threshold may be used as the value of $n_{PC}$.

In a second "rate of gradient change" technique, a medium order polynomial (such as a sixth-order polynomial) is fitted to the cumulative variance curve defined by Equation (20). The second derivative may be computed for this polynomial, and critical values (such as inflection points, maximum points, and minimum points) are determined. The ratio of the current value to the starting value of the function is also computed. The solution is either the value for which the function is a minimum or the first value for which the ratio is less than 0.01. In other words, if a minimum has not yet been detected but the maximum value of the function to this point is more than 100 times larger than the starting value, the current value is the solution (the value of $n_{PC}$). Note that the values 0.01 and 100 above are examples only.

In a third "root test" technique, only the principal components having eigenvalues that exceed the average eigenvalue are retained. The average root can be given as:

$$\bar{r} = \frac{Tr(\Sigma)}{dim(\Sigma)} \quad (23)$$

where the number of components to retain is determined from:

$$\sigma_{n_{PC}} < \bar{r}; \quad 1 < n_{PC} < dim(\Sigma). \quad (24)$$

In a fourth "segment test" technique, a line of unit length can be randomly divided into p segments. The expected length of the $k^{th}$ longest segment can be given as:

$$g_k = \frac{1}{p}\sum_{i=k}^{p}\frac{1}{i} \quad (25)$$

If the proportion of the $k^{th}$ eigenvalue is greater then $g_k$, the principal components through k can be retained.

In a fifth "pseudo-Bartlett" technique, the "sameness" of the eigenvalues can be approximated. The last retained principal component may represent the principal component corresponding to the smallest eigenvalue (or the smallest k assuming eigenvalues are ordered from largest to smallest) for which the first successive difference of the proportion of variability explained is greater than one quarter of the average proportion of variance. This can be expressed as:

$$\frac{\sigma_{i-1} - \sigma_i}{Tr(\Sigma)} > \frac{0.24}{p}. \quad (26)$$

The solution here is to find the largest value of i for which the preceding expression is true. Note that the values "one quarter" and 0.24 above are examples only.

In a sixth "Velicer's Test" technique, the technique is based on the partial correlation among the original variables with one or more of the principal components removed. This technique makes use of the fact that the original covariance matrix S can be reconstructed at any time from Equations (6)-(8). A new matrix $\psi$ can be defined as:

$$\psi \triangleq U\Sigma^{0.5} \quad (27)$$

where:

$$\psi\psi^T = S. \quad (28)$$

A partial covariance matrix can be expressed as:

$$S_k = S - \sum_{i=1}^{k} v_i v_i^T \quad (29)$$

$$k = 0 \Rightarrow p - 1$$

where $v_i$ represents the $i^{th}$ column in matrix $\psi$. A partial correlation matrix can be written as:

$$R_k = D_S^{-0.5} S_k D_S^{-0.5} \quad (30)$$

where $D_S$ represents a diagonal matrix made up of the diagonal elements of $S_k$. Here, $R_0$ represents the original correlation matrix, and R represents a scaled version of the matrix S. $R_k$ represents the $k^{th}$ partial correlation matrix, which is the matrix of correlations among the residuals after k principal components have been removed. The function:

$$f_k = \frac{\sum_{i=1}^{p}\sum_{j=1, j\neq i}^{p}(r_{i,j}^k)^2}{p(p-1)} \quad (31)$$

is the sum of the squares of the partial correlations at stage k and, as a function of k, may have a minimum in the range $1 < k < p$. The value of k corresponding to $f_k$ indicates the number of components to retain.

The raw data used to generate the PCA models can also be scaled, either manually or automatically by the early event detector 130. Manual scaling could be assigned to any subset of variables. In some embodiments, basic scaling can be accomplished according to the expression:

$$x_i = (y_i - c_i)/s_i \quad (32)$$

where $y_i$ represents the $i^{th}$ raw process variable, $x_i$ represents the $i^{th}$ scaled variable, $c_i$ represents the center value for the $i^{th}$ variable, and $s_i$ represents the scale value for the $i^{th}$ variable. For auto-scaled variables, the center and scale values ($c_i$ and $s_i$) may be recomputed each time a PCA model is updated or trained. Center and scale values can be calculated to ensure that the scaled variable is zero mean with unit variance. The user may be unable to adjust these values unless the mode of the early event detector 130 is changed from automatic to manual. Center and scale values for manually scaled variables may not be adjusted during training or model building operations. Both of these values may be directly accessible to the user, and an interactive dialog box may be provided to show their effects on the mean, variance, and distribution profile of a variable.

In some embodiments, an intrinsic assumption of a PCA model is that the data exhibits stationary behavior. For time series analysis, this is typically not the case. To attenuate this problem, an EWMA filter or other filter may be used as part of the scaling algorithm. The effect of the filter is to dynamically adjust the center value for a variable in an exponential fashion as given below:

$$\tau \frac{dc_i}{dt} + c_i = x_i \tag{33}$$

where $\tau$ represents the time constant of the filter (in minutes). Here, the time constant may be the same for all variables and can be user-specified, and the initial center value can be established as:

$$c_i(0) = \frac{1}{d}\sum_{j=1}^{d} x_i(j). \tag{34}$$

where the initialization interval d can be specified by the user. In addition to removing non-stationary effects from the training set of data, the filter may also provide feedback for the runtime predictor (the on-line component of the early event detector 130). As such, the time constant used in the runtime predictor can be different from the time constant used for model building (during training). Further, the filter time constant may be changed dynamically in the runtime environment to adaptively adjust as the non-stationary characteristics of the process adjust.

Temporal correlations and sensor noise may also be problematic for PCA-based calculations. Various techniques can be used to overcome temporal correlations. For example, the "lagged input" approach or a non-causal dynamic de-compensation technique can be used for dealing with this condition. Various techniques can also be used to overcome sensor noise. For example, running each input data stream through the following second-order filter may attenuate high-frequency sensor noise:

$$\frac{1}{(\tau s + 1)^2}. \tag{35}$$

Again, the time constant $\tau$ may be the same for all variables. In particular embodiments, the time constant is on the order of seconds ($\tau<1.0$), and the runtime predictor is run at a sub-minute interval.

Once load vectors have been calculated and the number of principal components to retain has been selected for a PCA model, the PCA model may be completely defined. Score vectors can then be calculated for any new data matrix. Let Z represent a score matrix calculated from a new data matrix X. It follows that the predicted value of the data matrix $\hat{X}$ can be defined as:

$$\hat{X} = ZP^T. \tag{36}$$

Predictive calculation of the scores using only the retained principal components can be expressed as:

$$Z = XP \tag{37}$$

which can be used to rewrite Equation (36) as follows:

$$\hat{X} = XPP^T. \tag{38}$$

The score and data estimation matrices can be calculated when batch data is available (such as in off-line mode using training data). The corresponding error matrix can be given as:

$$E = X - \hat{X}. \tag{39}$$

The $i^{th}$ row of E corresponds to the prediction errors at time i. The error and estimation vectors can be written as:

$$e_i = [e_{i,1}\, e_{i,2} \ldots e_{i,n}]^T \tag{40}$$

$$e_i = x_i - \hat{x}_i \tag{41}$$

$$x_i = [x_{i,1}\, x_{i,2} \ldots x_{i,n}]^T \tag{42}$$

$$\hat{x}_i = PP^T x_i. \tag{43}$$

When only incremental data is available (such as during runtime), the following calculations can be used for the score and estimation vectors, respectively:

$$z_i = (x_i^T P)^T = P^T x_i \tag{44}$$

$$\hat{x}_i = (z_i^T P^T)^T = P z_i. \tag{45}$$

When not all principal components are used, the residual or error defined in Equations (40)-(43) represents the part of the multivariable data that is not explained by the PCA model. This error or "residual" can be captured or characterized using a Q statistic. For example, the sum of the squared errors at time i can be defined as:

$$Q_i = \|x_i - \hat{x}_i\|_2^2. \tag{46}$$

$Q_i$ represents the sum of squares of the distances of $x_i - \hat{x}_i$ from the k-dimensional space defined by the PCA model. This value may be called the "square prediction error" (SPE). Alternatively, it could represent the sum of the squares of each row (sample) of E shown in Equation (39), which can be calculated as:

$$Q_i = (x_i - Pz_i)^T(x_i - Pz_i) \tag{47}$$

where the score vector $z_i$ is calculated using Equation (44). The $Q_i$ value indicates how well each sample conforms to the PCA model. It is a measure of the amount of variation in each sample not captured by the $n_{PC}$ principal components retained in the model.

The Hotelling $T^2$ statistic represents an overall measure of variability for a given system or process. For PCA analysis, the $T^2$ statistic can be given by the following expression:

$$T^2 = (x_i - \bar{x})^T S^{-1}(x_i - \bar{x}). \tag{48}$$

Here, $x_i$ represents the $i^{th}$ row of data in the matrix X. The distribution of the $T^2$ statistic can be given by:

$$\frac{n-p}{p(n-1)}T^2 \in F(p, n-p) \quad (49)$$

where n represents the number of rows in matrix X, p represents the number of columns in matrix X, and F represents an F-distribution. Another possible parameterization of the $T^2$ statistic can be given by:

$$\frac{c(n-p)}{p}T^2 \in F(p, n-p) \quad (50)$$

where $$c = \frac{1}{n-1}$$

represents the general case and $$c = \frac{n}{n^2 - 1}$$

represents a small observation correction case.

Interpretation of the Q statistic may be relatively straightforward since it may represent the squared prediction error. Interpretation of the $T^2$ statistic may occur as follows. The $T^2$ statistic may be concerned with the conformance of an individual vector observation with the "in control" mean of the vector. Insight can be obtained by looking at the geometrical interpretation of this statistic. This interpretation can be given directly through Equation (48). Where only a two element vector x is desired, Equation (48) can be written as:

$$T^2 = [x_1 - \bar{x}_1 \quad x_2 - \bar{x}_2]\begin{bmatrix} s_1^2 & s_{1,2} \\ s_{1,2} & s_2^2 \end{bmatrix}^{-1}\begin{bmatrix} x_1 - \bar{x}_1 \\ x_2 - \bar{x}_2 \end{bmatrix} \quad (51)$$

which can then be rewritten as:

$$T^2 = \frac{1}{1-\rho^2}\left(\frac{(x_1 - \bar{x}_1)^2}{s_1^2} - 2\rho\frac{(x_1 - \bar{x}_1)(x_2 - \bar{x}_2)}{s_1 s_2} + \frac{(x_2 - \bar{x}_2)^2}{s_2^2}\right) \quad (52)$$

where the correlation coefficient $\rho$ can be defined as:

$$\rho = \frac{s_{1,2}}{\sqrt{s_1^2}\sqrt{s_2^2}}. \quad (53)$$

When $x_1$ and $x_2$ are uncorrelated, $\rho$ equals zero, the middle term in Equation (52) is zero, and the constant coefficient outside the major parentheses is equal to one. As a result, this expression defines the equation of an ellipse aligned with the $x_1$ and $x_2$ axes. The center of the ellipse is at $(x_1,x_2)$. If $s_1$ is greater than $s_2$, the major and minor axes are $Ts_1$ and $Ts_2$, respectively, and the elliptic distance (the sum of the distances from the foci to the surface of the ellipse) is $2Ts_1$. When $s_2$ is greater than $s_1$, the roles of $s_1$ and $s_2$ in the major and minor axes and the elliptic distances are reversed. When $x_1$ and $x_2$ are correlated, $\rho$ is not zero, and the correlation coefficient defines the amount of rotation of the ellipse in the $x_1,x_2$ plane. Irrespective of the value of $\rho$, Equation (52) shows that $T^2$ is directly related to the distance that point $(x_1,x_2)$ is from the center of the ellipse. By extension, higher dimension ellipsoids may have the same general characteristics as discussed here for the two dimensional case.

While Equation (52) is used above to present the $T^2$ statistic, its computation makes use of the SVD results from the PCA training calculations. Since the data matrix used in the computations is zero mean, Equation (52) can be written as:

$$T_i^2 = x_i^T S^{-1} x_i. \quad (54)$$

Here, the i subscript has been added to the metric to emphasize that it is updated as a new x vector becomes available. While Equation (54) is a general statement for $T_i^2$, it can be rewritten to yield the following:

$$T_i^2 = x_i^T P \Sigma^{-1} P^T x_i \quad (55)$$

$$T_i^2 = z_i^T \Sigma^{-1} z_i \quad (56)$$

where the score vector $z_i$ is calculated as shown above. Equations (55) and (56) also describe an ellipse. In this case, however, the z values are uncorrelated, and the $\Sigma$ matrix is diagonal. Thus, this ellipse has no rotation, has a center at the (0,0) point, and is aligned with the i,j principal component directions.

While $Q_i$ and $T^2$ define what is happening to a system or process in an abstract sense, they alone may offer no real indication as to the cause of any anomalies. Ideally, any information relevant to determining the cause of the anomaly is also presented. To this end, the PCA model can be used to determine which inputs (variables) are likely responsible for any anomalous behavior. To be considered as a "key" variable, an input may simultaneously satisfy the following two criteria:

$$Q_i > Q_{lim}; \text{ and} \quad (57)$$

$$e_j = x_{i,j} - \hat{x}_{i,j} > r\sigma_j \quad (58)$$

where $Q_{lim}$ equals the $\alpha$ level confidence limit on Q, $\sigma_j$ represents the standard deviation of errors for the $j^{th}$ input variable during training, and r represents a probability level amplification factor (such as 2 or 3). The first criterion given in Equation (57) implies that there are no "key contributors" when Q is well-behaved (less than its limit or threshold). In Equation (58), once Q exceeds its limit, key contributors can be defined as those variables whose prediction error is larger than a fixed constant (r) times the standard deviation of the prediction errors encountered during the training data set.

While "key contributors" may be defined when Q exceeds its limit, "worst actors" (sometimes referred to as "bad actors") may be calculated and available regardless of the values of $Q_i$ and $T_i^2$. Worst actors represent a list of those variables whose prediction errors contribute most to the current value of $Q_i$. Worst actors can be ranked according to their percent contribution to Q as given in the following expression:

$$\eta_{j,i} = \frac{e_j^2}{Q_i}. \tag{59}$$

Once $\eta_{j,i}$ is calculated for all inputs, the variables can be sorted accordingly, with the largest percent contribution at the top of the list.

Another useful metric is the "score plot," where a score or z value (as defined in Equation (44)) is determined at each point in time. These values can be plotted as a function of the principal components. Since these principal components may define "subspace" directions and be orthogonal, the score values can be plotted in convenient Cartesian coordinates, where the evolution of the scores as a function of time is plotted against the principal components. A confidence ellipse can also be plotted and define an area of acceptable behavior, and both data from the training set and fresh data never seen by the model can be plotted (such as by using different colors). The plot can include any combination of subspace surfaces (including those subspaces corresponding to principal components not retained by the model).

Confidence bounds or limits can also be established for the $Q_i$ and $T^2$ statistics. In some embodiments, confidence limits can be computed for all key system metrics. In particular embodiments, one-dimensional limits can be computed and displayed graphically for both the $Q_i$ and $T_i^2$ statistics. Two-dimensional limits may also be computed and displayed graphically for the scores. In addition, the scores may be displayed in higher dimension spaces (such as hypercubes), where the three Cartesian dimensions and possibly additional dimensions (such as forth and fifth dimensions accommodated by color, sphere size, or other data point attributes) are used. Projections and rotations of the scores can also be displayed.

In some embodiments, a Q confidence limit for the $Q_i$ parameter can be calculated using the technique of unused eigenvalues. Here, the parameters relating to the unused eigenvalues can be defined as follows:

$$\theta_j = \sum_{i=PC+1}^{n} \lambda_i^j \tag{60}$$
$$j = 1 \rightarrow 3.$$

The distribution of unused eigenvalues may be defined as:

$$h = 1 - \frac{2\theta_1\theta_3}{3\theta_2^2} \geq 0. \tag{61}$$

With these definitions, a value $\xi$ can be specified as:

$$\xi = \theta_1 \frac{\left(\frac{Q}{\theta_1}\right)^h - \frac{\theta_2 h(h-1)}{\theta_1^2}}{\sqrt{2\theta_2 h^2}}. \tag{62}$$

The value $\xi$ is approximately normally distributed with zero mean and unit variance (meaning $\xi \in \hat{N}(0,1)$). Solving the preceding expression for Q (the Q limit) gives:

$$Q^*(\xi|_\alpha) = \theta_1 \left[ \xi^* \frac{\sqrt{2\theta_2 h^2}}{\theta_1} + \frac{\theta_2 h(h-1)}{\theta_1^2} \right]. \tag{63}$$

Since Q is a quadratic function here, the one-sided limit for $\xi^*$ may be determined as the alpha solution to the normal probability density function.

In some embodiments, a $T^2$ confidence limit for the $T_i^2$ parameter can be calculated as follows. The $T_i^2$ metric may be directly related to the F-distribution. As a result, the $T^2$ confidence limit can be given by the following expression:

$$T^{2^*}(F|v_1, v_2, \alpha) = \frac{n_{PC}}{c(n-n_{PC})} F^*(n_{PC}, n-n_{PC}, \alpha). \tag{64}$$

F* may be determined as the alpha solution to the F-probability density function.

Once these confidence limits are determined, a confidence ellipse can be generated. Since the distribution of the $T^2$ statistic may be related to the F-distribution as illustrated in Equation (64), by a direct application of the definition of the F-distribution, the probability that:

$$z^T \sum^{-1} z \geq \frac{n_{PC}}{c(n-n_{PC})} F^*(n_{PC}, n-n_{PC}, \alpha) \tag{65}$$

is the $\alpha$ level (such as 5%, 1%, or 0.1%) of the $F(n_{PC}, n-n_{PC})$ distribution can be determined. Since the preceding expression represents an $n_{PC}$-dimensioned ellipsoid, this ellipsoid represents the joint distribution of the score vector z. In this form, there are no rotations of the ellipsoid as Z is diagonal and the ellipsoid is aligned is with the principal directions (principal components). The ellipsoid may be defined by the training data, and all scores within the ellipsoid may be at the $(1-\alpha)$ probability level. Hence, during prediction, it can be determined with relative confidence (such as 95%, 99%, or 99.1%) that scores outside the ellipsoid are not from the same distribution as the training set.

Depending on the implementation, it may be impractical to present higher dimensioned surfaces to a user. The early event detector 130 may therefore present z confidence distributions as two-dimensional ellipses. These ellipses can be interpreted as a plane through the ellipsoid. Hence, the $z_i, z_j$ distribution can be expressed as follows:

$$\begin{bmatrix} z_i & z_j \end{bmatrix} \begin{bmatrix} \lambda_i^2 & \\ & \lambda_j^2 \end{bmatrix}^{-1} \begin{bmatrix} z_i \\ z_j \end{bmatrix} = \frac{n_{PC}}{c(n-n_{PC})} F^*(n_{PC}, n-n_{PC}, \alpha). \tag{66}$$

Combining terms gives the following equation for the final form of a confidence ellipse used in a score plot presented by the early event detector 130:

$$\frac{(z_i - 0)^2}{\left[\sqrt{\lambda_i^2 \psi^*}\right]^2} + \frac{(z_j - 0)^2}{\left[\sqrt{\lambda_j^2 \psi^*}\right]^2} = 1 \tag{67}$$

-continued $$\psi^* = \frac{n_{PC}}{c(n-n_{PC})} F^*(n_{PC}, n-n_{PC}, \alpha). \quad (68)$$

In Equations (67) and (68), zeros are shown explicitly to emphasize that the center of the ellipse is at the (0,0) location. Also, the squared terms in the denominators are shown explicitly to emphasize that major and minor diameters are given by the corresponding square terms (such as $\sqrt{\lambda_i^2 \psi^*}$). Ellipses in any i,j plane, regardless of the number of principal components retained in the model, can be displayed by simply scrolling the ordinate or abscissa to the desired indices (direction) using controls in the score plot. It can be noted that Equations (67) and (68) show how the PCA approach renders a set of principal components that form an orthogonal coordinate system aligned with the ellipsoid defined by Equation (48). As a result, the principal components form the axes of the confidence ellipse.

As described above, the early event detector 130 can use various distributions during operation. Examples of these functions are defined as follows. Here, v and Γ are the degree of freedom and the gamma function, respectively. The "normal" distribution can be given by:

$$f(x) = \frac{1}{\sqrt{2\pi}} e^{-\frac{x^2}{2}}. \quad (69)$$

The "Student's t" distribution can be expressed as:

$$f(t, v) = \frac{1}{\pi v} \frac{\Gamma((v+1)/2)}{\Gamma(v/2)} \left(1 + \frac{t^2}{v}\right)^{-\left(\frac{v+1}{2}\right)}. \quad (70)$$

The "Chi Squared" distribution can be represented as:

$$f(\chi^2, v) = \frac{1}{2^{v/2} \Gamma(v/2)} e^{-\chi^2} [\chi^2]^{v/2-1}. \quad (71)$$

The "F" distribution can be expressed as:

$$f(F, v_1, v_2) = \left(\frac{v_1}{v_2}\right)^{\frac{v_1}{2}} \frac{\Gamma((v_1+v_2)/2)}{\Gamma(v_1/2)\Gamma(v_2/2)} F^{\left(\frac{v_1}{2}-1\right)} \left(1 + \frac{v_1}{v_2} F\right)^{-\left(\frac{v_1+v_2}{2}\right)}. \quad (72)$$

A probability solution can also be used, where starred variables are designated as the solution using the respective probability density functions. The variables of interest may include n*, t*, $\chi^*$, and F*. These values can be conceptually obtained by solving the following expression for the stared value:

$$\tilde{P} = \alpha \int_0^{\xi^*} f \, df \quad (73)$$

where $\tilde{P}$ represents the user-specified confidence level (such as 95%, 99%, or 99.1%), α equals one or two (depending on whether a one-sided or two-sided distribution is assumed), and ξ*represents the value that solves the preceding integral expression.

The early event detector 130 may further support one or more functions to deal with missing or bad data. There are various techniques that could be used for dealing with missing or bad data. The particular technique selected may depend on how the data is being used. For example, a distinction can be made depending on whether the data is used for training (off-line) or for prediction/evaluation (on-line).

In particular embodiments, two techniques may be available for treating bad or missing training data during PCA model synthesis. One is row elimination, and the other is element elimination. In row elimination, any row in the data matrix X containing a bad or missing data element is automatically removed. In element elimination, the covariance calculations are altered in an inline fashion such that only the effects of an individual bad value are removed from the computation. Since any operation (such as +, −, *, and /) involving a bad value may itself result in a bad value, the covariance calculations can be "unfolded" such that the results of these bad value operations are removed. The inline covariance approach may require the use of index markers to isolate bad value locations. The technique for dealing with bad training data can be specified by the user at any time, and the default option may be to delete rows from the data matrix.

For prediction data, one of the bad or missing data options during prediction could involve replacing the bad data. The early event detector 130 may also support various imputation techniques for dealing with bad or missing prediction data. The imputation techniques represent techniques that impute or estimate those values that are bad or missing based on available valid data. The imputed values can then be used as input values, and the prediction may proceed in a conventional fashion. In some embodiments, dynamic restarts can be invoked automatically when enough input channels contain invalid data such that the imputation algorithm produces unreliable estimates.

Several different types of imputation methods can be used for imputing bad or missing data based on known PCA models. These include trimmed score (TRI), single component projection (SCP), joint projection to a model plane (PMP), iterative imputation (II), minimization of squared prediction error (SPE), conditional mean replacement (CMR), least squares on known data regression (KDR), and trimmed score regression (TSR). The user could be allowed to select the desired imputation method(s) to be used.

In the projection to the model plane or "PMP" approach, consider the score vector at the $i^{th}$ sample interval as shown above in Equation (44). Up to this point, the P matrix has been implicitly given as $P=V(1:n_{PC})$. In the following, P is full dimension (meaning P=V), and subscripts are used to define the partitioning. In this case P is orthonormal, and the multivariable vector of new measurements can be expressed as:

$$x = Pz. \quad (74)$$

Here, the subscript i has been dropped as a matter of notational convenience. In addition, in the following, it is assumed that the data matrix X is of dimension n×k. Consider that the new observation vector x has some bad or missing data. Take the first r elements of x to be the bad or missing data and the remaining k−r elements to be valid data. The observation vector can be portioned as:

$$x = \begin{bmatrix} x^\# \\ x^* \end{bmatrix} \quad (75)$$

where $x^\#$ represents the bad or missing data vector, and $x^*$ represents the observed valid data vector. This induces the following partition in the data matrix X:

$$X = [X^\# X^*]. \quad (76)$$

In the preceding expression, $X^\#$ is a sub matrix containing the first r columns of X, and $X^*$ accommodates the remaining k−r columns. Correspondingly, the P matrix can be portioned as:

$$P = \begin{bmatrix} P^\# \\ P^* \end{bmatrix} \quad (77)$$

where $P^\#$ is a sub matrix containing the first r rows of P, and $P^*$ accommodates the remaining k−r rows. Assuming that p principal components (p<k) are retained, only the first p elements of the score vector $\hat{z}_{1:p}$ may be relevant. Thus, the following can be obtained:

$$P = [P_{1:p} \quad P_{p+1:k}] = \begin{bmatrix} P^\#_{1:p} & P^\#_{p+1:k} \\ P^*_{1:p} & P^*_{p+1:k} \end{bmatrix}. \quad (78)$$

From this, Equation (74) can be rewritten as:

$$x = \begin{bmatrix} x^\# \\ x^* \end{bmatrix} \quad (79)$$
$$= \begin{bmatrix} P^\#_{1:p} & P^\#_{p+1:k} \\ P^*_{1:p} & P^*_{p+1:k} \end{bmatrix} \begin{bmatrix} z_{1:p} \\ z_{p+1:k} \end{bmatrix}.$$

By definition, the residual vector e can be given by:

$$e = P_{p+1:k} z_{p+1:k} \quad (80)$$
$$= \begin{bmatrix} e^\# \\ e^* \end{bmatrix}$$
$$= \begin{bmatrix} P^\#_{p+1:k} z_{p+1:k} \\ P^*_{p+1:k} z_{p+1:k} \end{bmatrix}.$$

The observation vector x can therefore be defined as:

$$x = \begin{bmatrix} x^\# \\ x^* \end{bmatrix} \quad (81)$$
$$= \begin{bmatrix} P^\#_{p+1:k} z_{p+1:k} \\ P^*_{p+1:k} z_{p+1:k} \end{bmatrix} +$$

-continued $$\begin{bmatrix} e^\# \\ e^* \end{bmatrix}$$

or:

$$x = P_{1:p} z_{1:p} + e. \quad (82)$$

From Equation (82), if no values are input for bad or missing variables ($x^\#$), the scores may be based only on valid values of the measured variables ($x^*$). As a result, the model for this case can be expressed as:

$$x^* = P^*_{1:p} z_{1:p} + e^* \quad (83)$$

or:

$$e^* = x^* - P^*_{1:p} z_{1:p}. \quad (84)$$

The goal may be to find the score vector $z_{1:p}$ that minimizes the error vector $e^*$. The least squares solution to this problem is given by:

$$z_{1:p} = [P^{*T}_{1:p} P^*_{1:p}]^{-1} P^{*T}_{1:p} x^*. \quad (85)$$

Equation (85) gives the solution to the score vector any time there are bad or missing values in the data vector x. This may be true for any $1 \leq p \leq k$. This approach is the so-called "projection to the model plane" technique. This technique could be affected by the loss of orthogonality between columns of P induced by missing data under extreme conditions, but in many practical situations the loss is negligible.

Direct solution of Equation (85) can be problematic depending on the implementation. With the columns of $P^{*T}_{1:p}$ nearly collinear, $P^{*T}_{1:p} P^*_{1:p}$ may become arbitrarily ill-conditioned. In this case, the inversion may not be performed directly, and the solution may require some form of rank revealing decomposition. An iterative method can be used to bypass the factorization step required for a collinear P matrix. For the iterative approach, Equation (85) can be rewritten as:

$$\begin{bmatrix} x^\# \\ x^* \end{bmatrix} = \begin{bmatrix} P^\#_{1:p} \\ P^*_{1:p} \end{bmatrix} z_{1:p} + \begin{bmatrix} e^\# \\ e^* \end{bmatrix}. \quad (86)$$

If the bad or missing values of $X^\#$ are known, the direct solution for the score vector is given by:

$$z_{1:p} = P^T_{1:p} x = P^{\#T}_{1:p} x^\# + P^{*T}_{1:p} x^*. \quad (87)$$

Substituting this into Equation (86) yields a new estimate of $x^\#$ as:

$$x^\# = P^{\#T}_{1:p} z_{1:p} \quad (88)$$

which can be substituted back into Equation (87) to yield a new estimate of $z_{1:p}$. This procedure can be repeated until converged. The algorithm may initially assume that $x^\#(0)=0$. At convergence, the estimated score vector may be equivalent to that obtained by Equation (85) and therefore is equivalent to the PMP method. For nearly collinear P, this approach may experience the same deleterious effects as in the solution of Equation (85). Near collinearity can be easily detected in the iterative solution. When this condition arises, the KDR approach can automatically be called to ensure a reliable solution.

In the least squares on known data regression or "KDR" approach, new scores are computed based on the assumption that the current data is from the same distribution as the original training data. Because of this, the estimation may be based on the original training data matrix X. Up to this point, the Z matrix has been implicitly given as $Z=T(1:n_{PC})$. In the following, Z is full dimension (meaning Z=T), and subscripts are used to define the partitioning. In this technique, the data matrix X may be written as follows:

$$X = Z_{1:p} P_{1:p}^T + E \quad (89)$$

where:

$$E = T_{p+1:k} P_{p+1:k}^T. \quad (90)$$

Here, E is the residual matrix of the original trained model. The score matrix for the p retained principal components can be given by the following expression:

$$Z_{1:p} = X^* P^*_{1:p} + X^\# P_{1:p}^\#. \quad (91)$$

The goal may be to estimate the scores from an observation vector with bad or missing values. This can be accomplished based on the data matrix used in the construction of the PCA model. To do this, a model based on the preceding expression can be defined as follows:

$$Z_{1:p} = X^* \beta + \zeta. \quad (92)$$

which can be written in terms of the error matrix as:

$$\zeta = Z_{1:p} - X^* \beta. \quad (93)$$

A solution for the unknown matrix β, which is an estimate for $P^*_{1:p}$, could be one that minimizes the error matrix and hence the term $X^\# P_{1:p}^\#$. The least squares solution of Equation (93) can be:

$$\beta = [X^{*T} X^*]^{-1} X^{*T} Z_{1:p} \quad (94)$$

where X* contains the k–r columns of the data matrix corresponding to the measured values of the new incomplete elements of the observation vector x. The estimated value of the score vector can then be expressed as:

$$\hat{z}_{1:p} = \beta^T x^*. \quad (95)$$

In Equation (95), x* is the new observation vector with the bad or missing values removed, and the solution matrix β is a (k−r)×p dimensioned matrix. Depending on the implementation, the direct solution of Equation (94) may not be possible since it may not be feasible to store the data matrix corresponding to the original training data. However, it may be possible to reconstruct any covariance information related to the training data. From Equations (6)-(8), the following expression can be written for the scaled covariance matrix:

$$X^T X = (n_r - 1) P \Sigma P^T. \quad (96)$$

Therefore, the following can be obtained:

$$X^{*T} X^* = (n_r - 1) P^* \Sigma P^{*T} \quad (97)$$

$$X^{*T} X^\# = (n_r - 1) P^* \Sigma P^{\#T}. \quad (98)$$

From the definition of the score matrix for retained principal components, the following can be obtained:

$$X^{*T} Z_{1:p} = X^{*T} (X^\# P_{1:p}^\# + X^* P^*_{1:p}). \quad (99)$$

The following expression can then be obtained for β that is independent of the data matrix X:

$$\beta = [P^* \Sigma P^{*T}]^{-1} P^* \Sigma P^{\#T} P_{1:p}^\# + P^*_{1:p}. \quad (100)$$

Since $P^T P = I$, the expression of β can be modified to the following final form:

$$\beta = [P^* \Sigma P^{*T}]^{-1} P^*_{1:p} \Sigma_{1:p}. \quad (101)$$

Equation (95) can then be modified as follows to produce the final scores:

$$\hat{z}_{1:p} = \Sigma_{1:p} P^*_{1:p}{}^T [P^* \Sigma P^{*T}]^{-1} x^*. \quad (102)$$

While Equation (102) may represent the analytical solution for the KDR technique, it can be ill-conditioned for collinear problems. The following represents a new solution in which the KDR technique is reformulated as a 2-norm problem and solved using a rank revealing QR factorization. A two-step procedure can be used in this solution. A new matrix D can be defined as:

$$D = \Sigma^{0.5}. \quad (103)$$

Next, without loss of generality, the columns of β can be taken to be full dimension k. This allows Equation (101) to be rewritten as:

$$[P^* \Sigma P^{*T}] \beta = P^* \Sigma. \quad (104)$$

Equations (103) and (104) can be combined to provide:

$$[P^* D D P^{*T}] \beta = P^* D D. \quad (105)$$

This expression may be equivalent to the minimization of the following 2-norm problem:

$$\min_{\beta_j} = \frac{1}{2} \| D P^{*T} \beta_j - d_j \|_2^2 \quad (106)$$

where $\beta_j$ represents the $j^{th}$ column of the β matrix, and $d_j$ represents the $j^{th}$ column of the D matrix. Equation (106) can be solved using a rank revealing QR factorization of $DP^{*T}$. The factorization may need to be computed only once an interval if any missing or bad values are detected. The p beta vectors (j=1→p) may be sequentially computed with simple back substitution using the corresponding columns of $Q^T d_j$. This procedure may continue for j=1→p. When completed, the $\beta_{1:p}$ matrix may have been computed in a numerically robust fashion without ever having formed $P^* \Sigma P^{*T}$. Finally, the scores can be computed using Equation (95). It may be necessary to impute any bad or missing data. Since $X = ZP^T$, the unknown data can be given as $X^\# = ZP^{\#T}$, and the individual bad or missing data vector can be updated as shown in the following equation:

$$x^{\#T} = z^T P^{\#T}. \quad (107)$$

One benefit of this imputation capability is the ability to effectively suppress the effects of spurious behaviors of one or more variables during runtime operation. The KDR technique, for example, can be used for this task. Since the KDR technique imputes values as if they were from the original training set, variables that are suppressed may have virtually no effect on the performance of the PCA model (although performance may be affected if enough variables are suppressed such that $DP*^T$ becomes ill-conditioned). In runtime operation, any variable can be suppressed by setting a suppression flag that is available for each variable. Algorithmically, no distinction may be made between missing data and suppression. Suppression can be invoked manually, automatically, or programmatically. Any variable can be either suppressed or, if it is already in a suppressed state, unsuppressed. Suppressing or un-suppressing variables can be accomplished in a seamless fashion. Since data is assumed to be from the original distribution, statistics may not be adversely affected. In many cases, transitions may be bumpless as long as the transitions do not occur during periods of strongly anomalous behavior.

The above description has provided a mathematical basis for various operations performed in one embodiment of the method 200, particularly those steps related to the creation and refinement of PCA models. A user interface supporting invocation of some of these functions by the early event detector 130 is shown in FIGS. 3 through 43, which are described below. Other embodiments of the method 200 or early event detector 130 may operate using any other or additional bases.

Although FIGS. 2A and 2B illustrate one example of a method 200 for early event detection, various changes may be made to FIGS. 2A and 2B. For example, while shown as a series of steps, various steps in the method 200 could overlap or occur in parallel. Also, various steps could be added, omitted, or combined according to particular needs.

FIGS. 3 through 43 illustrate an example tool for early event detection. In particular, FIGS. 3 through 43 illustrate various details regarding one specific implementation of a user interface for the early event detector 130 of FIG. 1. The details shown in FIGS. 3 through 43 are for illustration and explanation only. Other embodiments of the early event detector 130 may operate in any other suitable manner. Also, while specific input and output mechanisms (such as a mouse, keyboard, and other I/O devices) are described below, these are for illustration only.

Figure 3:
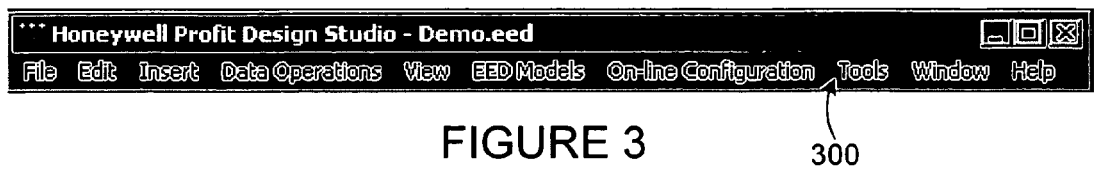
Figure 4:

FIGS. 3 and 4 illustrate an example user interface for invoking various functions related to the creation, testing, and deployment of statistical models. More specifically, FIG. 3 illustrates an example menu 300, and FIG. 4 illustrates an example toolbar 400. The menu 300 and toolbar 400 could, for example, be displayed as part of a window generated by a computing device running a MICROSOFT WINDOWS operating system. In particular embodiments, the early event detector 130 can be invoked in any suitable manner, such as by invoking PROFIT DESIGN STUDIO from HONEYWELL INTERNATIONAL INC. and then invoking the early event detector 130 via PROFIT DESIGN STUDIO. The menu 300 and toolbar 400 can then be used by the user to select a wide variety of functions, such as to create or modify a PCA, Fuzzy Logic, or EED model.

Some or all of the functions listed in the menu 300 can be accessed in other ways, such as via buttons on the toolbar 400, using hotkeys, or in any other suitable manner. Moving from left to right in FIG. 4, the buttons in the toolbar 400 can be used to invoke the following functions:

Set overall options (of the early event detector 130)
Perform PCA calculations (create/train PCA models)
Perform Fuzzy Logic calculations (create/train Fuzzy Logic models)
Create EED models
Evaluate EED models in full prediction mode
Show detailed PCA model results for components and statistics
Show PCA contributors and score plots
Add, remove, and modify events
Deconvolve PCA models
Perform data vector operations
Perform NaN (bad/missing data) detection
Mark bad data
Unmark bad data
Show/hide bad data marks
Display zoom options with current settings.

FIGS. 5 and 6 illustrate an example user interface for initiating creation of a new model with the early event detector 130. When creating a new *.EED file (such as via the "File" option in the menu 300), the user can be presented with a data selection window 500 shown in FIG. 5. Radio buttons 502 allow the user to select whether to import data from one or more data files or from an external source. In general, the imported data may contain test data for a number of variables. The test data generally includes sampled values for process variables, taken over a period of time, that are representative of the expected conditions for which a model is desired. Test data from files having data from one point or multiple points can be used.

If the "Data Files" option is selected, the user can be presented with a list of files and allowed to select the particular file(s) for importation. Possible files that can be selected for importation could include *.MPT (ASCII multiple point data) files, *.PNT (ASCII single point data) files, and *.XPT (XML-formatted multiple point data) files.

If the "External Source" option is selected, an empty document of the selected type may be created and opened. Empty open documents may support the import of data from one or more external (non *.MPT, *.XPT, or *.PNT) sources. These sources can include another data-based document type, such as an *.MDL file (a model file in PROFIT DESIGN STUDIO) imported directly to an *.EED file. These sources could also include an external application, such as MICROSOFT EXCEL.

When data is imported into the early event detector 130, the user may be presented with a document 600 as shown in FIG. 6. The document 600 includes a list 602 of the variables defined in the imported data. In this example, the list 602 identifies (among other things) the name, type, class, and description of the variables in the imported data. The same or similar document 600 can be presented to the user when the user chooses to open an existing *.EED file (rather than creating a new one by importing data).

FIGS. 7A and 7B illustrate an example user interface for editing variable data and other model data with the early event detector 130. Editing of model data can be invoked via the "Edit" option under the menu 300 or in any other suitable manner. This may present the user with a list 700 of functions as shown in FIG. 7A. Access to the functions in this list 700 may be dependent on the current state of the application, such as the current view, a selection status, and past events. Typical edit operations include cutting, copying, pasting, and deleting operations. The cut, copy, paste, and delete operations may be applied to data and can be used to move or rearrange data and models within a given document or to merge data into one or more documents. The copy and paste operations can also be performed using the standard drag-drop functionality. A "Select All" option can be used as a shortcut to select all variables depending on the current view. "SpecialMod" options can be used for copying, pasting, and deleting models. "Undo" and "Insert New Variable" options may pertain only to a spreadsheet view (such as that shown in FIG. 6) and can be used, for example, to create a new variable in the document 600.

A "Var Info" option in the list 700 can be used to present a dialog box 750 as shown in FIG. 7B, which supports the editing of descriptive information about a variable. As a particular example, the user could select a variable in the list 602 of FIG. 6 and then select the "Var Info" option in the list 700 to edit the information for that variable. In FIG. 7B, text boxes 752 allow the user to edit a variable's name, point or tagline, parameter, general description, and engineering units. Radio buttons 754 allow the user to edit the variable's type (training variable or input variable). In some embodiments, the user may be unable to change the type of or to "Reduced Variable (RV)," where reduced variables are used during principal component regression and may be unavailable in *.EED applications. In particular embodiments, variable type could be irrelevant in *.EED applications, and both training variables and input variables can be used as inputs to any PCA model. However, when the type is changed, it can have a significant effect depending on which procedures have been performed. A type change may involve deleting and replacing a variable, and one or more warning messages may be displayed to the user when the type is changed.

Figure 8:
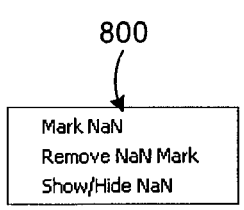

FIG. 8 illustrates an example user interface for marking bad or missing data with the early event detector 130. Special marks can be used with operating data, such as via the "Insert" option under the menu 300. This may present the user with a list 800 of functions as shown in FIG. 8. These marks can be used to designate bad/missing data, or data that may not be used for certain operations (such as model training). The marks can be inserted or removed using the options in the list 800. In addition, these marks may or may not be displayed, depending on the last option in the list 800. The marking and unmarking of data could also be accomplished using the appropriate buttons in the toolbar 400.

Figure 9:
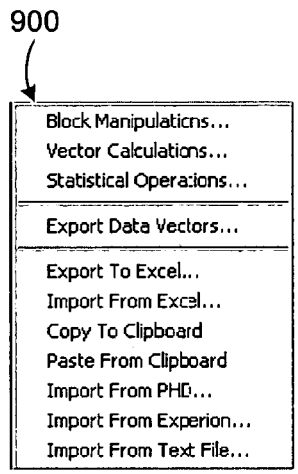

FIG. 9 illustrates an example user interface for invoking different data manipulations with the early event detector 130. The data manipulations can be invoked, for example, via the "Data Operations" option under the menu 300. This may present the user with a list 900 of functions as shown in FIG. 9. Manipulations to be performed on data (with the exception of the cut, copy, paste, and delete operations) can be listed here. The first two options pertain to the actual altering of a resident process or raw data. The third option allows the user to quickly assess the overall statistical properties of the data. The remaining options deal with the importing and exporting of data. By using block manipulations, selected variables can be manipulated simultaneously. Multiple ranges of selected variables can be modified using a host of options in an interactive fashion, and undo options can eliminate potential problems. Detailed calculations can be applied to one or more variables and performed using the "Vector Calculation" option. These calculations can include transformations, filters, statistics, manual editing, outlier detection, and the ability to combine multiple variables. Operations can be stacked with source and destination variables automatically recovered.

Figure 10:
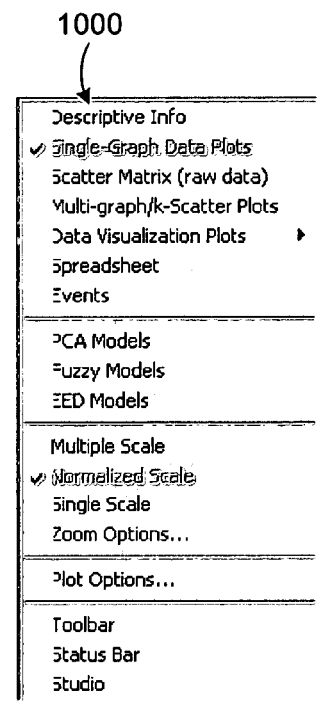

FIG. 10 illustrates an example user interface for selecting different views or presentations of information provided by the early event detector 130. Different views can be selected for presentation, for example, via the "Views" option under the menu 300. This may present the user with a list 1000 of options as shown in FIG. 10. As examples, the views may allow the user to view displays containing data plots with different ranges, models, scalings, zooms, and other options. The options preceding the first separator bar in the list 1000 correspond to views associated with operating data. The next group of options pertains to the various types of models that can be shown. The third group of options can be used to configure how various data is displayed in data plots. The last group of options can be used to enable/disable the toolbar and a status bar at the bottom of a window.

Figure 11:
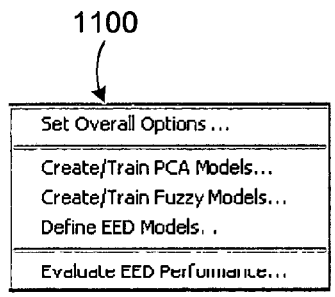

FIG. 11 illustrates an example user interface for building different models using the early event detector 130. For example, selection of the "EED Models" option in the menu 300 can present the user with a list 1100 of model operations as shown in FIG. 11. This list 1100 can be used to invoke all of the functions associated with creating and analyzing EED (statistical) models. It can also support the overall setup and prediction operations. Typically, the operations in the list 1100 are invoked from top to bottom. These options can be used to create, train, modify, reconfigure, analyze, and evaluate PCA models, Fuzzy Logic models, and EED models. Users can also select and exclude data, invoke alternate scaling strategies, invoke calculations for the various model types, and assess the predictive performance of any or all of the various models. Additional details regarding the creation of models are shown in FIGS. 13 through 43, which are described below.

Selection of the "On-line Configurations" option in the menu 300 can be used to make models available to the on-line module of the early event detector 130 for prediction use. Selection of this option may support the creation of a set of on-line predictor(s). This option could provide a single option for selecting/configuring a final model. In addition to selecting and configuring one or more model(s), this option may also support the creation of all of the files that are necessary to run the selected models in predictive mode in the on-line environment.

Figure 12:
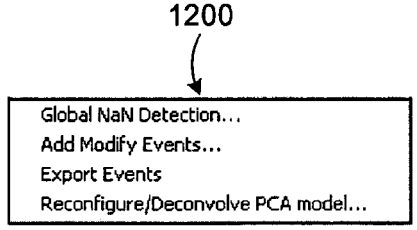

Selection of the "Tools" option in the menu 300 can be used to make specific tools available to the user. This may present the user with a list 1200 of tools as shown in FIG. 12. Tool functions, such as global outlier detection, can be available during a statistical modeling session. To create or modify events, the second option in the list 1200 can be selected. Additional details regarding the creation or modification of events are shown in FIGS. 25 through 29, which are described below. At any time, the current state of events can be exported by using the third option, which can transfer all event information from one file to another. The last option may be used to evaluate new techniques that involve using PCA models recursively for deconvolving covariance information.

FIGS. 13 through 43 illustrate an example user interface for building different models using the early event detector 130. In particular, these figures illustrate different dialog boxes and other interface mechanisms that can be presented to the user when PCA, Fuzzy Logic, and EED models are constructed.

The user is able to set various options at the top level of the early event detector 130 by selecting "Set Overall Options" in the list 1100 or the appropriate button in the toolbar 400. This presents the user with a dialog box 1300 as shown in FIG. 13. In the dialog box 1300, radio buttons 1302 allow the user to select which technique is used to determine the number of principal components to retain during PCA model generation. For the "Threshold" technique, the default threshold value could be "90%" or any other value, and up-down buttons could be used to alter the percentage. A "Confidence Levels" section 1304 of the dialog box 1300 allows the user to specify the confidence levels used to establish probability limits for the Q and $T^2$ statistics. The default value for each statistic could be "95%" or any other value, and up-down buttons could be used to alter the percentages. Radio buttons 1306 allow the user to define how bad or missing data is handled by the early event detector 130 during training and prediction, as described above.

The creation of a new PCA model can be initiated by selecting the "Create/Train PCA Models" option under the menu 300, the appropriate button in the toolbar 400, or in any other suitable manner. This may present a dialog box 1400 to the user, as shown in FIG. 14. The dialog box 1400 includes a drop-down menu 1402 identifying existing PCA models and buttons 1404 for invoking certain PCA-related functions.

Figure 15:
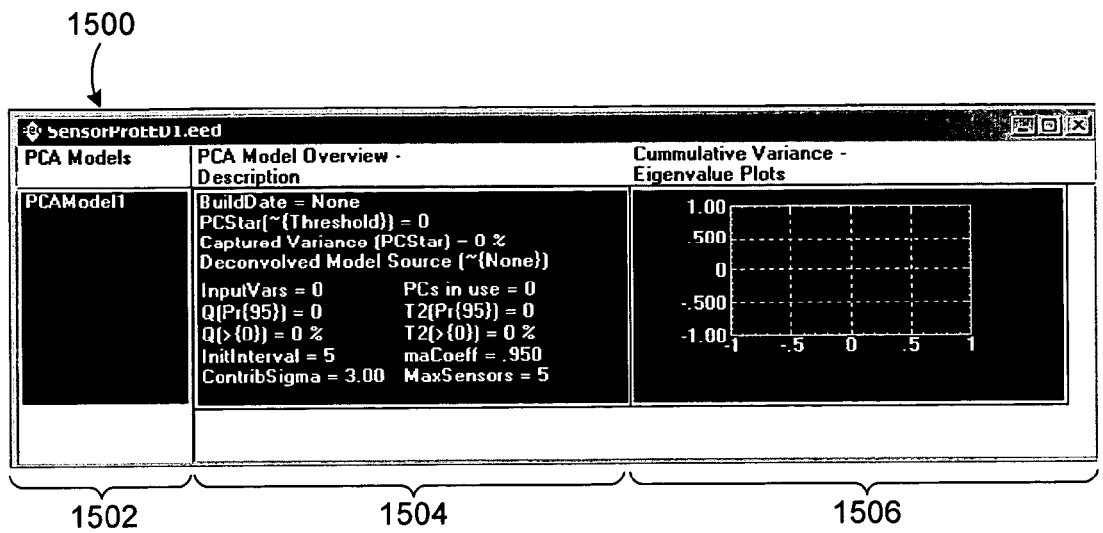

If the user selects the "Create New Model" button 1404 in the dialog box 1400, a new model is created and listed in a PCA model view 1500, which is shown in FIG. 15. In this example, the PCA model view 1500 lists existing PCA models and the new PCA model being created. The PCA model view 1500 may highlight the new model or a model selected by the user with a dark background. In this view 1500, the left column 1502 identifies the name of a PCA model. The remaining columns 1504-1506 are filled in as a new PCA model is created and trained.

Selecting the "Show and Select Inputs" button 1404 in the dialog box 1400 can present the user with a dialog box 1600 shown in FIG. 16. This dialog box 1600 allows the user to specify variables to be used in generating a PCA model. Different approaches could be used for selecting variables to be included in the PCA model. One approach includes using many measured variables in the PCA model and, without prescreening the variables, attempting to use as many of these variables as possible. This comprehensive approach can discover unsuspected relationships between variables that are useful in detecting problems of interest. Another approach is to select only variables relevant to a particular problem of interest. This approach may rely more heavily on a user's knowledge of a process or system in selecting variables. A compromise could be to use a combination of both approaches, such as by starting with a set of variables fundamental to key relationships in the system or process (such as mass and energy balances) and then adding expected correlated variables (such as temperature profile in a column).

In FIG. 16, a list 1602 identifies variables that can be selected for inclusion in a PCA model. A list 1604 identifies variables that have already been included in the PCA model, where the PCA model has been trained using those variables. A list 1606 identifies variables to be added to the PCA model during the next training of the PCA model. In general, the variables listed in the list 1606 do not become part of the PCA model until the PCA model is trained using those variables. "Add" and "Remove" buttons 1608 can be used to move variables between the list 1602 and the lists 1604-1606. A "Load Existing" button 1608 can be used to ignore any changes to the variables and to restore the lists 1602-1606 to the current state of the PCA model (the state associated with the last training of the PCA model, if any).

Figure 17A:
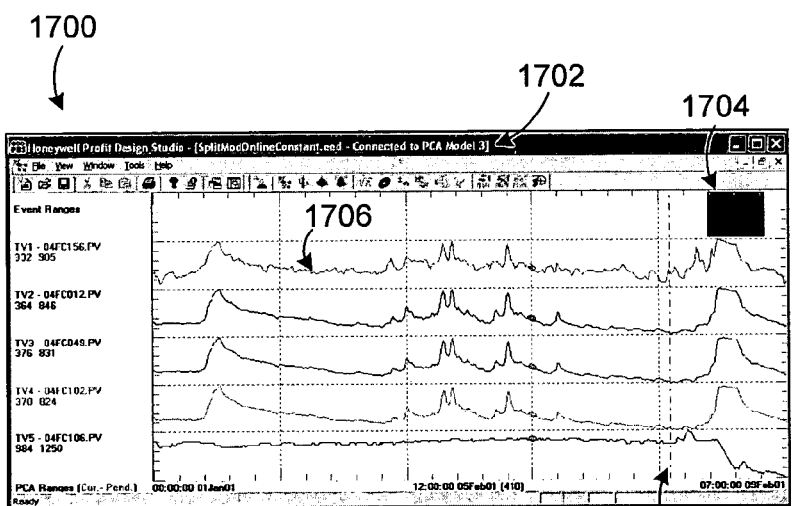

Selecting the "Show & Exclude Data Ranges" button 1404 in the dialog box 1400 can present the user with a dialog box 1700 as shown in FIG. 17A. As described above, a PCA model can be trained using a set of normal operational data and then evaluated against a known set of abnormalities. The user can therefore gather a set of normal operating data to train the PCA model and a set of data that includes both normal and abnormal events to test the PCA model. The dialog box 1700 shown in FIG. 17A can be used to select the training data for developing a PCA model. As shown here, a title bar 1702 of the dialog box 1700 identifies the model that the data exclusion is being applied to. An annotation 1704 identifies an event that has been identified by the early event detector 130 or the user. Lines 1706 represent plots of the varying values of different variables over time.

Figure 17B:
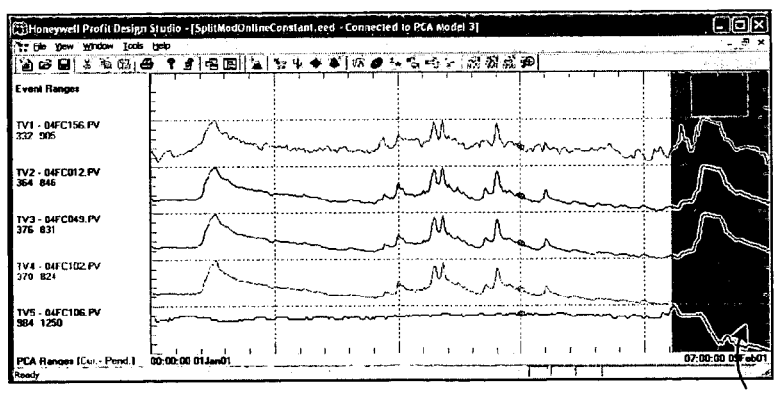

The user can select a range of data in the dialog box 1700 for exclusion or inclusion in any suitable manner. For example, the current position associated with a mouse or other input device may be denoted by a dashed line 1708. The mouse can be swept just outside the graph along the x-axis with the left mouse button depressed, which selects a range of data. Once the left mouse button is released, the data range selected by the user can be denoted using highlighting 1710 as shown in FIG. 17B. At this point, the highlighting 1710 is illustrated as a grey background, which indicates the pending exclusion of the data range. During the next training of the PCA model, the selected data range is excluded from the training set, and the highlighting 1710 may change (such as to a purple cross-hatched pattern) to denote the actual exclusion of the selected data range.

Figure 17C:
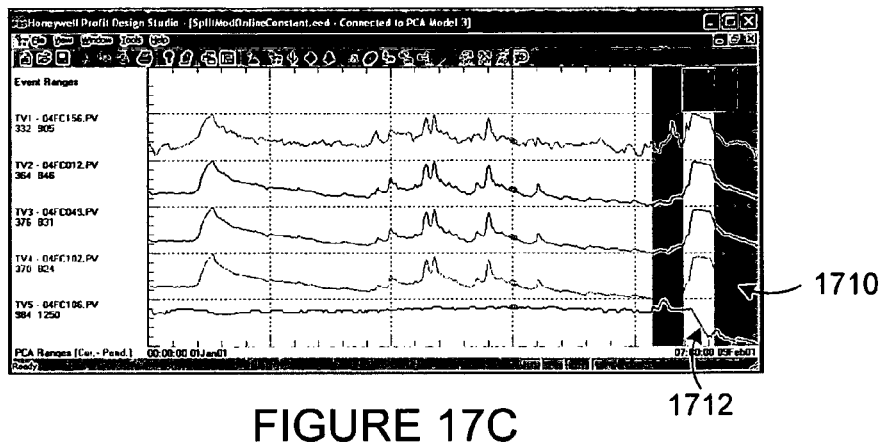

As shown in FIG. 17C, it is also possible to re-include data from an excluded data range. Again, the user can sweep the mouse across the excluded data range while depressing the left mouse button and the "control" key or other key on a keyboard. This allows the user to identify either the data range(s) to be re-included or the data range(s) to remain excluded. In the example shown in FIG. 17C, the PCA model has not been trained with the excluded data range, and the grey highlighting 1710 has been modified to include a re-included section 1712. If the PCA model had been trained with the excluded data range, the highlighting 1710 could represent purple cross-hatching, the data range to remain excluded could be identified by a grey background at the bottom of the cross-hatching, and the data range to be re-included could omit the grey background at the bottom of the cross-hatching.

Figure 18:
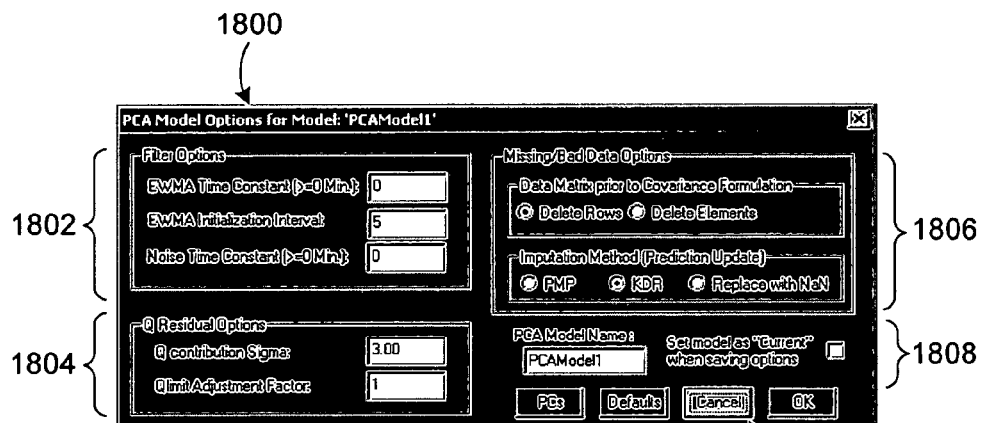

Selecting the "Set Model Options" button 1404 in the dialog box 1400 can present the user with a dialog box 1800 as shown in FIG. 18. This dialog box 1800 can be used, for example, to set a number of options for each PCA model, such as options that affect the dynamic updating of model offsets, how residual error is visualized, how missing data is handled, and a name of the model. In FIG. 18, text boxes 1802 allow the user to specify the type of filtering for the PCA model. EWMA filtering updates the PCA model mean dynamically, and the user can specify the time constant for the EWMA filter and the number of observations before the EWMA filter initializes after the model starts running. The EWMA time constant may be system or process dependent and could be defined for a particular system or process using detection of annotated events as a guide. The user can also specify the noise time constant for filtering data prior to computation.

Text boxes 1804 allow the user to specify options related to the Q statistic, such as a contribution sigma and an adjustment factor. The contribution sigma represents the number of standard deviations that the residual error on an individual variable needs to exceed before that variable is considered a "bad actor" or "key contributor." The adjustment factor represents an amount reduced or subtracted from the residual error during the determination of whether a variable is a "bad actor" or "key contributor."

Radio buttons 1806 allow the user to define how missing or bad data is handled. Controls 1808 allow the user to change the name of the PCA model (using a text box) and to indicate that changes have been made to the PCA model but the PCA model is not going to be retrained (using a checkbox). Buttons 1810 can be used to view PCA model details after training (PCs button), accept changes to the PCA model (OK button), and restore the model to its prior defaults (Default button).

Figures 19, 21:
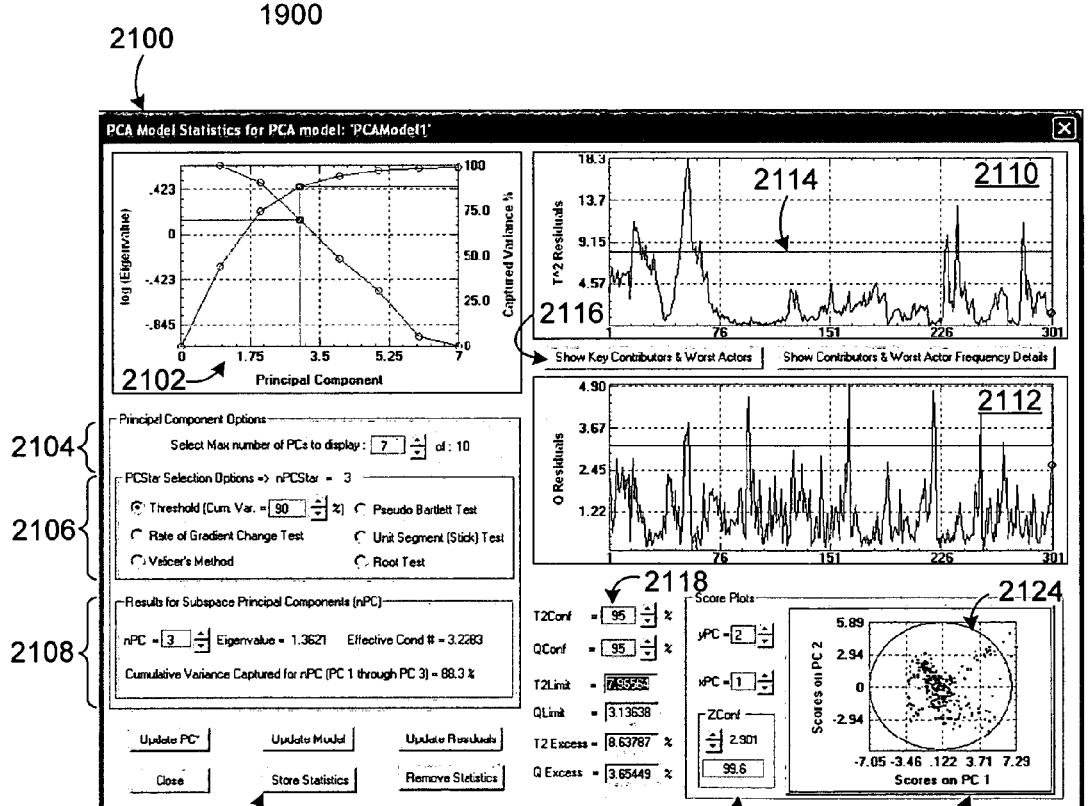

Selecting the "Train Model" button 1404 in the dialog box 1400 can present the user with a training window 1900 as shown in FIG. 19. The training window 1900 allows the user to track the progress of the PCA model training. Optionally, the user may be required to request presentation of the training window 1900, such as via the "Window" option in the menu 300. In this example, the training window 1900 identifies when different operations are completed during the training of the PCA model.

Figure 20:
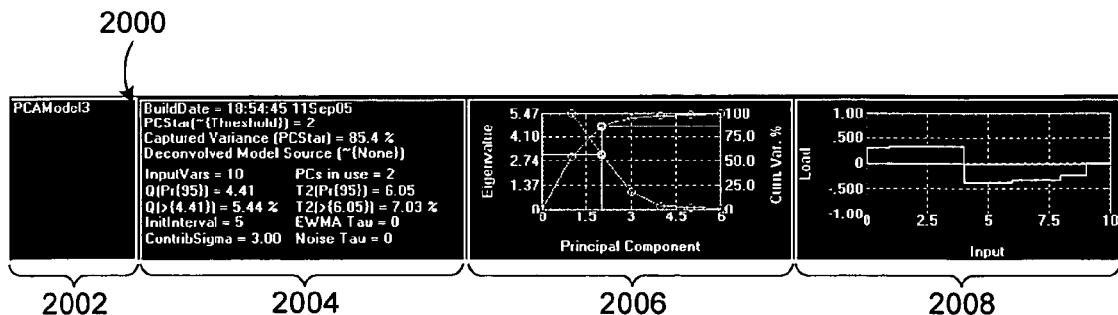

Once trained, an updated PCA model view 2000 shown in FIG. 20 (as updated from FIG. 15) can be presented to the user. The updated model view 2000 includes column 2002, which identifies the model name. Columns 2004-2008 include a populated overview of the PCA model (column 2004) with cumulative variance/eigenvalue plots (column 2006) and load vector plots (column 2008).

In this example, column 2004 includes information such as the date that a PCA model was built (BuildDate) and the number of retained principal components (PCStar{~Threshold}). The term "Threshold" here identifies the algorithm selected for calculating the number of retained components, such as the algorithm selected using the radio buttons 1302 in FIG. 13. The information in column 2004 also includes the fraction of total variance captured in the trained model (Captured Variance), whether a deconvolved model source was used, and the number of input variables (InputVars). The information in column 2004 further includes the confidence level for the Q statistic based on the training data (Q(Pr)), where  represents the confidence level) and the amount of data that exceeds the confidence limit for the Q statistic (Q(>{*})), where * represents the value of the confidence limit). The information in column 2004 also includes the number of steps required for initialization of the moving average (InitInterval), the number of standard deviations required for a residual error to be considered a "bad actor" or "key contributor" (ContribSigma), and the number of principal components actually in use in the model (PCs in use). This information further includes the confidence level for the $T^2$ statistic based on the training data (T2(Pr**)) and the amount of data that exceeds the confidence limit for the $T^2$ statistic (T2(>{*})). In addition, this information includes the EWMA time constant in minutes (EWMA Tau) and the time constant for noise filtering in minutes (NoiseTau). Clicking on column 2004 in the PCA model view 2000 could present the user with the dialog box 1800 in FIG. 18, allowing the user to adjust various ones of these parameters.

Column 2006 in FIG. 20 contains cumulative variance/eigenvalue plots. The eigenvalues can be shown in one color (such as green) in the plot and correspond to one axis (such as the left axis) of the plot. Each marker may denote the eigenvalue for a specific principal component. The principal components in the model can be shown another color (such as magenta) in the plot. The horizontal line leading to the left axis shows the eigenvalue for the final principal component in the model. The cumulative variance captured in the model for each principal component can be shown in a third color (such as blue or yellow) in the plot and may correspond to another axis (such as the right axis) of the plot. Again, each marker may denote the cumulative captured variance for a specific principal component. The horizontal line leading to the right axis shows the cumulative captured variance in the model. Clicking on this column 2006 in the view 2000 may present the user with a PCA model statistics dialog box 2100, which is shown in FIG. 21. The appropriate icon in the toolbar 400 can also provide the dialog box 2100 to the user.

As shown in FIG. 21, the PCA model statistics include a "Cumulative Variance-Eigenvalue" plot 2102. In this example, the plot 2102 is similar to the plot in column 2006 of view 2000, but the left axis has been modified to represent the natural logarithm of the eigenvalues. Controls 2104-2108 allow the user to control the number of principal components shown in the plot 2102 (controls 2104), to control the algorithm used to reduce the number of principal components (controls 2106), and to view specific information about a selected principal component (controls 2108). The up-down arrows in the controls 2108 allow the user to move through the principal components and view the eigenvalue, captured variance, and effective condition number for that component (this information is displayed in the controls 2108).

On the right side of the dialog box 2100, plots 2110-2112 chart the high-level statistics ($T^2$ and Q residuals) as a function of index number. The confidence limits for these statistics can also be shown in the plots 2110-2112 using lines 2114. Buttons 2116 can be used to access more detailed dialog boxes related to the key contributors and worst actors for these statistics. Examples of these dialog boxes are provided in FIGS. 22A through 22D, which are described below. For large data sets, these could be time consuming calculations, and a message box can be displayed if the calculation time exceeds a threshold (such as thirty seconds).

Controls 2118 in the dialog box 2100 allow the user to configure limits associated with the Q and $T^2$ statistics. Up-down buttons in the controls 2118 can be used to alter the confidence levels for the Q and $T^2$ statistics. The calculated confidence limits and the amounts of data in the training set that exceed these limits are then shown within the controls 2118.

A scatter plot 2120 can be used to plot principal component scores associated with the PCA model. The scores that are displayed can be selected using controls 2122. The "ZConf" setting in the controls 2122 determines the limit drawn as a confidence ellipse 2124 in the scatter plot 2120, where scores within this ellipse 2124 fall below the specified confidence interval. The limit is shown here as a Z score (such as 2.901), and the corresponding confidence interval (such as 99.6%) is shown immediately below the Z score in the controls 2122.

Buttons 2126 allow the user to control calculations and model updates. An "Update PC*" button re-calculates the number of retained principal components based on the setting in controls 2106. An "Update Model" button updates the PCA model with the current PCStar and statistical limit settings. An "Update Residuals" button updates the plots 2110-2112 and the limit and excess values displayed in the controls 2118. A "Store Statistics" button sends the Q residual, $T^2$ residual, and optional individual residuals to a workspace (such as for analysis outside of PROFIT DESIGN STUDIO), and a "Remove Statistics" button removes the stored statistics from the workspace.

Selection of the "Show Key Contributors & Worst Actors" button 2116 in the dialog box 2100 may present the user with a "Key Contributors & Worst Actors" screen, which can be used to analyze a PCA model. A similar screen may be available in an engineering interface for runtime models. This screen provides a comprehensive view of the comparison between the expected behavior of the system or process (as predicted by the PCA model) and the actual or observed values. The contents in this view may be yoked to a single time-based scroll bar. An example of this screen 2200 is provided in FIG. 22A. Here, a list 2202 identifies the "worst actors" or variables that contribute to the Q statistic at a current focus point in time. A bar chart 2204 graphically illustrates the contribution of these variables to the Q statistic. The list 2202 may provide the names of the top bad actors in rank order.

To view the predicted value versus the measured value for any bad actor, the user can click on a variable's name in the list 2202. This displays information associated with the selected variable in a "Q Residuals" plot 2206 and a "$T^2$ Residuals" plot 2208. Circles 2209 in the plots 2206-2208 identify the current focus point, which determines the contents of the list 2202 and the bar chart 2204. Details of the focus point are shown between the two plots 2206-2208 and may include the time and date, the index number in the data set, the calculated Q and $T^2$ statistics, and the confidence limit values for the Q and $T^2$ statistics. The user can zoom in and out of the plots 2206-2208 using, for example, the left mouse button to select the zoom area along the x (time) axis. Also, the focus circles 2209 in the plots can be moved in any suitable manner, such as by using scroll buttons on either side of the plots or a scroll bar if viewing a zoomed residual plot.

A scatter plot 2210 charts scores for a selected pair of principal components based on the settings of controls 2212. A "ZScores" section in the controls 2212 determines which principal component scores are shown in the scatter plot 2210. An "Ellipse Confidence Level" section in the controls 2212 allows the user to control the limit drawn as a confidence ellipse in the scatter plot 2210. Scores within this ellipse may fall below the specified confidence interval. The limit is shown as a Z score or number of standard deviations (such as 2.985), and the corresponding probability level (such as 99.7%) is shown immediately below the Z score. If the data in a calculation came from data used to train the PCA model, markers in the scatter plot 2210 can appear in one color (such as blue). Data that is outside the training set may appear in another color (such as green).

A checkbox in the controls 2212 can be used to toggle a "snake plot" capability of the scatter plot 2210. When the checkbox is checked, the scatter plot 2210 may be cleared, and the user can trace the path of the displayed scores over a time sequence by moving the focus circle 2209 in the plot 2206. This may generate a snake plot 2250 as shown in FIG. 22B (which takes the place of the scatter plot 2210 in FIG. 22A). The snake plot 2250 connects scores in the plot 2250 as a function of time, showing the order in which the scores are determined. The snake plot 2250 can be cleared at any time by unchecking the checkbox in the controls 2212.

Figure 22A:
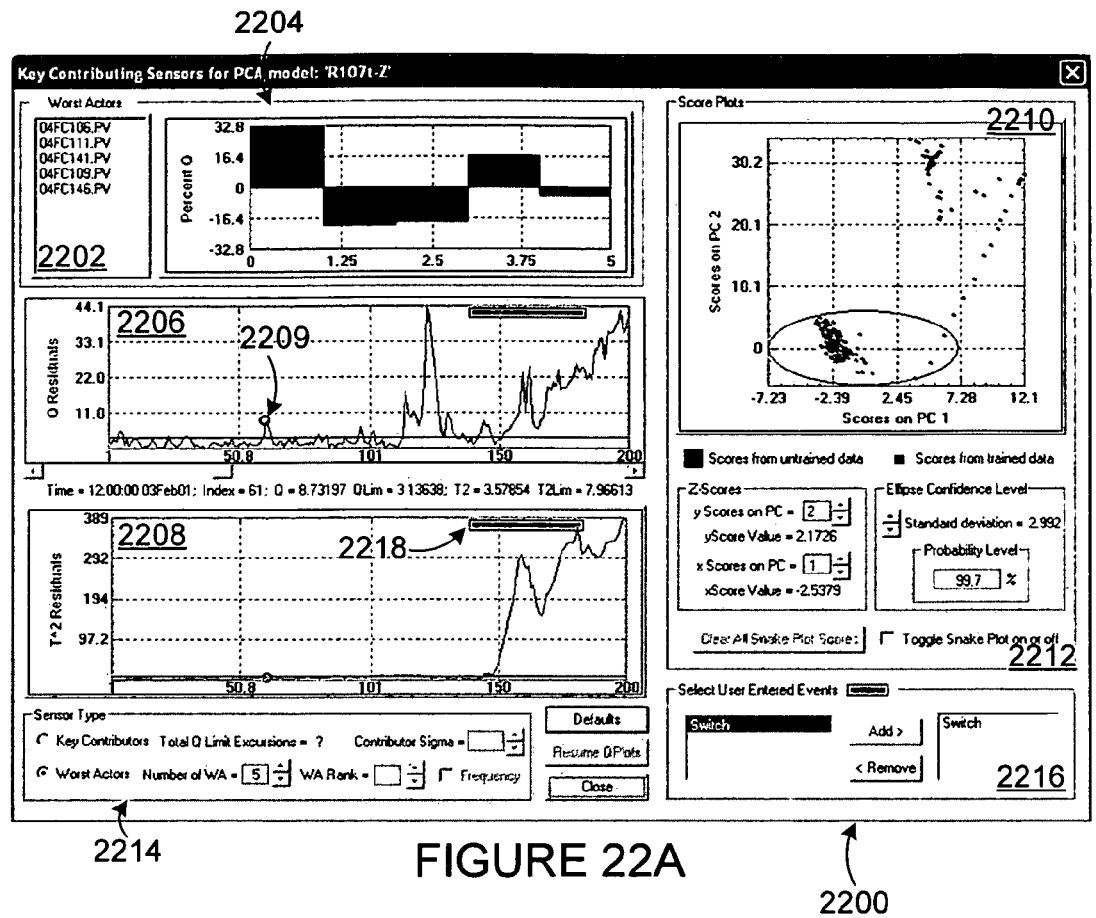
Figure 22B:
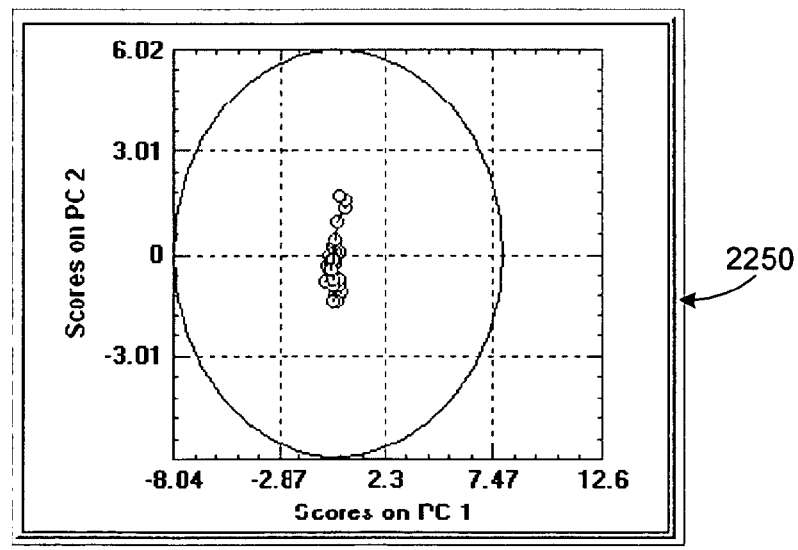
Figure 22C:
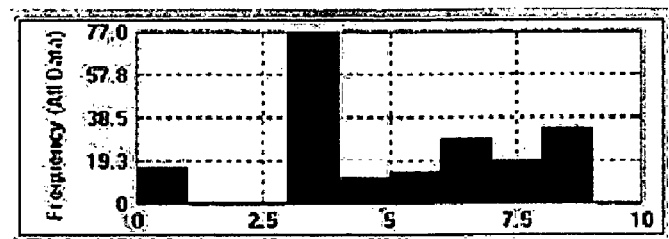
Figure 22D:
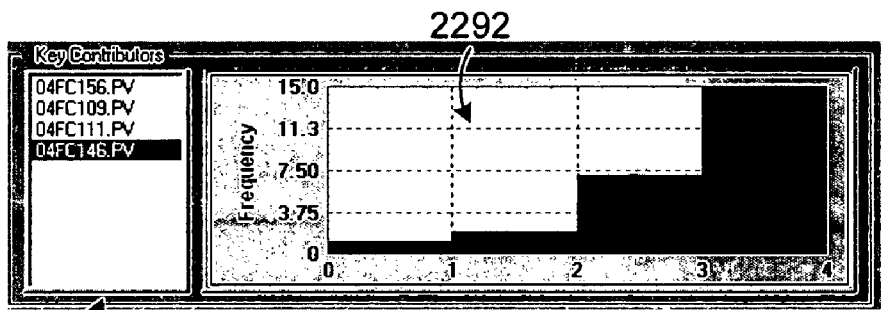

Controls 2214 allow the user to control the contents of the list 2202 and bar chart 2204 shown in FIG. 22A. In this example, the user has chosen to view information about the "worst actors" and can control the number of worst actors shown in the list 2202 and bar chart 2204 using the controls 2214. The user could also choose to view information about "key contributors" using the controls 2214. A checkbox in the controls 2214 can be used to toggle the bar chart 2204 between identifying the bad actors by percent contribution to the Q statistic and the frequency distribution of the bad actors across an entire data set. When the checkbox is checked, the bar chart 2204 in FIG. 22A could be replaced by the bar chart 2270 as shown in FIG. 22C.

When the "key contributors" option is selected, if there are no excursions above the confidence limit, there may be no "key contributors" identified in the screen 2200 (since key contributors are only defined for Q residuals exceeding the confidence limit). If there are excursions above the confidence limit, the list 2202 and the bar chart 2204 in FIG. 22A may be replaced by the list 2290 and bar chart 2292 shown in FIG. 22D. Here, the y-axis of the bar chart 2292 changes to frequency count and identifies the frequency at which the confidence limit is exceeded. Also, the list 2290 may rank the variables based on the frequency distribution shown in the chart 2292. The number of standard deviations required to be considered a "key contributor" can be controlled using the "Contributor Sigma" option in the controls 2214. Increasing the number of standard deviations may require a more significant model mismatch for each variable.

Controls 2216 in the screen 2200 allow the user to select and display annotated events as part of the plots 2206-2208. The events are denoted in the plots 2206-2208 using event indicators 2218. Candidate events defined by the user can be shown in the left list of the controls 2216 and can be added to the right list (and therefore shown in the plots 2206-2208) using the "Add" button. Similarly, the "Remove" button may remove an event from the right list (and therefore remove the indicator 2218 shown in the plots 2206-2208) and place the event in the left list. Additional details regarding the definition of user-defined events are shown in FIGS. 25 through 29, which are described below.

Selection of the "Show Key Contributors & Worst Actor Frequency Details" button 2116 in dialog box 2100 may present the user with a "Key Contributors & Worst Actor Frequency Details" screen, which may give a comprehensive view of the comparison between the expected behavior of a system or process and the observed values. This screen may be similar to the screen 2200 shown in FIG. 22A. However, instead of showing the bad actors at the current focus point (as is done in the bar chart 2204 of FIG. 22A), a frequency distribution of the bad actors across an entire data set can be shown in the bar chart.

Figure 23:
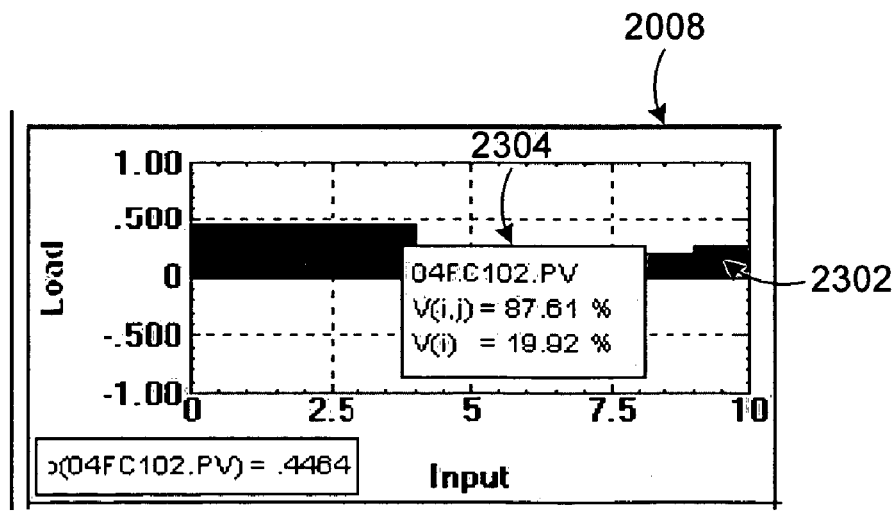

Additional information about a PCA model can be obtained by placing the mouse cursor over different bars in the bar chart displayed in column 2008 of the PCA model view 2000 in FIG. 20. An example of this is shown in FIG. 23. Each bar 2302 in the bar chart in column 2008 represents the load vector for a single principal component. This visualization shows the general shape of the principal components and provides a quick comparison between models in the PCA model view 2000. The user could select one or more bars 2302 in the chart and, depending on what action the user takes, a text box 2304 can be displayed containing various information. For example, if the user clicks on one of the bars 2302, the text box 2304 may contain the name of the input variable and the numeric value for the principal component of the load vector associated with that variable. The user could also view numeric values for the entire load vector by clicking and holding the left mouse button anywhere within the column 2008, which may also display the captured variance for a principal component and the cumulative captured variance in the text box 2304. In addition, the user may click on any bar 2302 in the chart and hold the mouse button down to see values for V(i,j) (the proportion of the variance of the $i^{th}$ variable that is accounted for by the $j^{th}$ principal component) and V(i) (the percentage of the remaining variance that is due to the $i^{th}$ variable). This last example is illustrated in FIG. 23, while the first two examples may function using similar text boxes 2304 with different contents.

Selection of the "View/Manually Set Scale" button 1404 in the dialog box 1400 of FIG. 14 can present the user with a dialog box 2400 as shown in FIG. 24. This dialog box 2400 allows the user to change EWMA filter options, set a variance scale and a fixed center point, change a range of calculations to current or pending, change a scaling mode to automatic or manual, set the scaling mode for all variables simultaneously, and adjust the parameters of the noise filter. This may provide "what if?" capabilities, allowing the user to view how the changes affect a model without saving the changes to the model. After updating the selections in the dialog box 2400, the user may retrain the PCA model to incorporate the new scaling.

As shown in FIG. 24, the dialog box 2400 identifies the PCA model in a title bar 2402. Controls 2404 allow the user to select one or more variables from a list. Plots 2406-2408 represent a frequency distribution chart and a time series trend for at least one variable selected using the controls 2404. The plot 2406 represents the scaled data (mean centered and variance scaled) using the current scaling settings. The plot 2408 represents the scaled data over time. From these two plots 2406-2408, the user can generally see how well the scaled data conforms to a normal distribution with zero mean and unit variance.

To change the scaling, a variable can be selected using controls 2404, such as by clicking on the variable name. When selected, the plots 2406-2408 may change to reflect the current scaling of the selected variable. Controls 2410 allow the user to adjust various scaling parameters, including the scaling mode (whether scaling for the selected variable is automatic or manual). If manual scaling is selected, the user can specify values using the controls 2410 for the scale and/or center parameters. If an EWMA filter is used, a static center value may not be applicable and therefore need not be specified. At this point, a "Redo Scale" button 2412 can be selected to view the results of the updated scale factors. For example, the plots 2406-2408 and the "Scaled Data" section of the controls 2410 may be updated with new information. To commit the scaling changes, the "Update Data" button 2412 can be selected. Otherwise, leaving the dialog box 2400 without updating the scaling data may result in no changes occurring to the model. Selecting the "Cancel" button 2412 may exit the dialog box 2400 and discard all changes, while exiting by clicking the "OK" button 2412 may commit the changes for the next build of the PCA model. If changes are made and saved, a message may be provided to the user urging the user to retrain the PCA model. Also, if changes are made and saved, the user may be unable to enter the dialog box 2400 again until the PCA model has been retrained.

FIGS. 25 through 29 illustrate an example user interface for creating or specifying events for use in building a PCA model or other types of models. The creation of events can be invoked, for example, by selecting the "Add/Modify Events" option in the menu 300. When selected, the user may be presented with a data selection window 2500 shown in FIG. 25. In this example, radio buttons 2502 allow the user to specify whether data defining one or more events can be imported from one or more data files or manually entered. If the "Event Data Files" option is selected, the user may be presented with a list of files and allowed to select the particular file(s) for importation.

FIG. 26 illustrates one example format of an event data file 2600. This format could be used, for example, in a text file or a MICROSOFT EXCEL file. In this example, the first two lines in the file 2600 represent an event definition section and define a single event. This section identifies the name of the event and the variables that are associated with the event. The fourth and fifth lines in the file 2600 represent an event instance section and define a single event instance. The second column of the fifth line represents the start time of the event, and the third column represents the end time for the event. There are a number of unused fields, shown by blank cells or having the text "NONE" or "0." These fields may not be important to the event definition but may be required for proper formatting of the file 2600.

Figure 27:
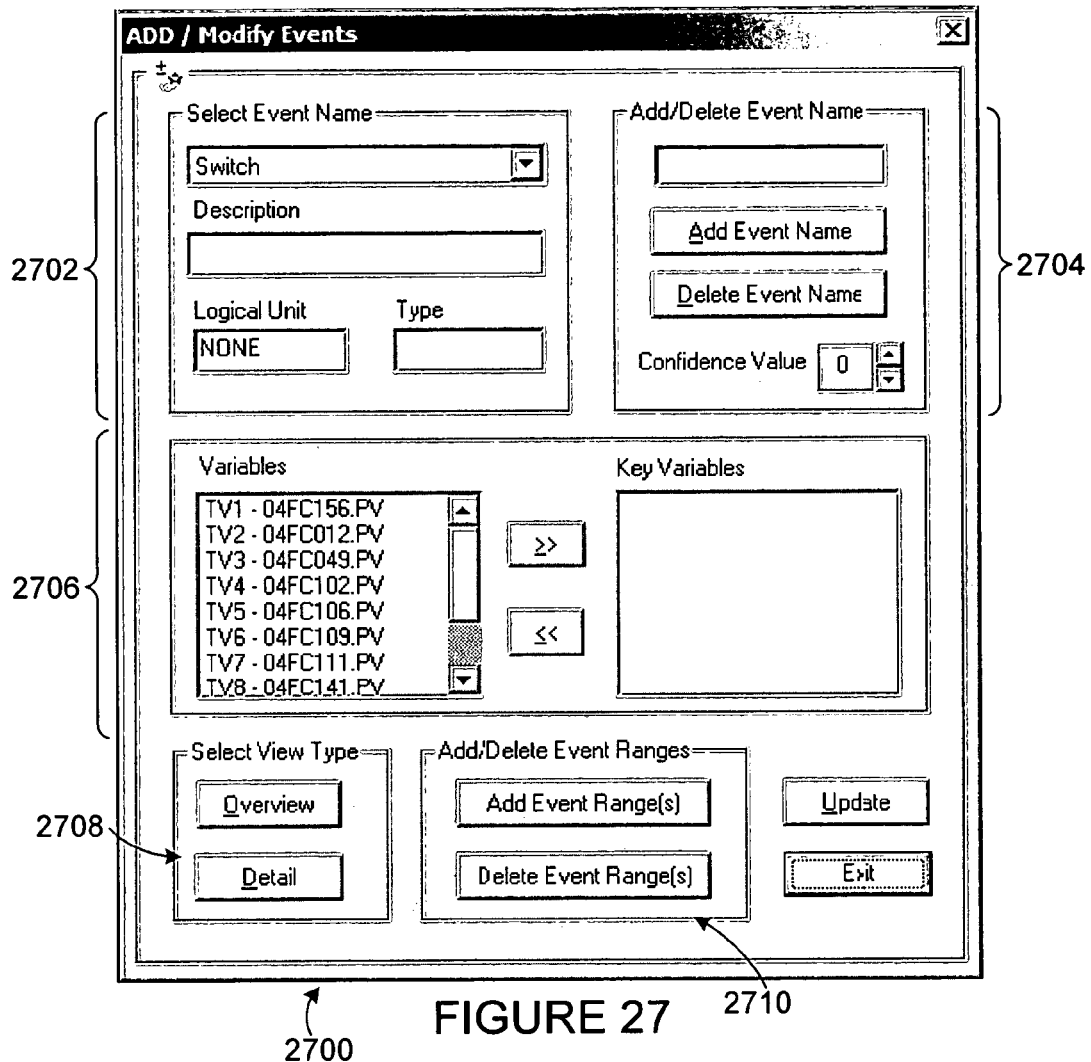

When the "Event Data Files" option is selected in FIG. 25 and one or more data files are identified by the user, a dialog box 2700 as shown in FIG. 27 may be presented to the user. The dialog box 2700 could also be presented to the user when the user selects the "Manually Entered" option in FIG. 25. Controls 2702 allow the user to select a previously-defined event (whether defined in a data file or by the user) and to specify a description, logic unit, and type associated with the event. Controls 2704 allow the user to manually add or delete events by name and to specify a confidence value for an event. Controls 2706 allow the user to specify the key variables associated with an event. Buttons 2708 allow the user to control how events are displayed to the user for review. Buttons 2710 allow the user to add or delete event ranges, which allows the user to define the times when events have occurred.

Figure 28:
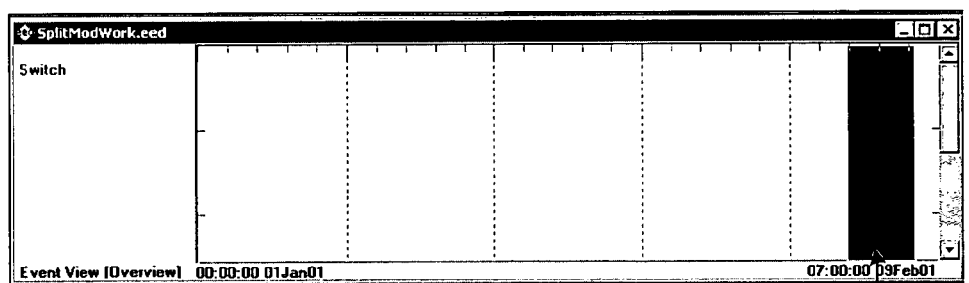
Figure 29:
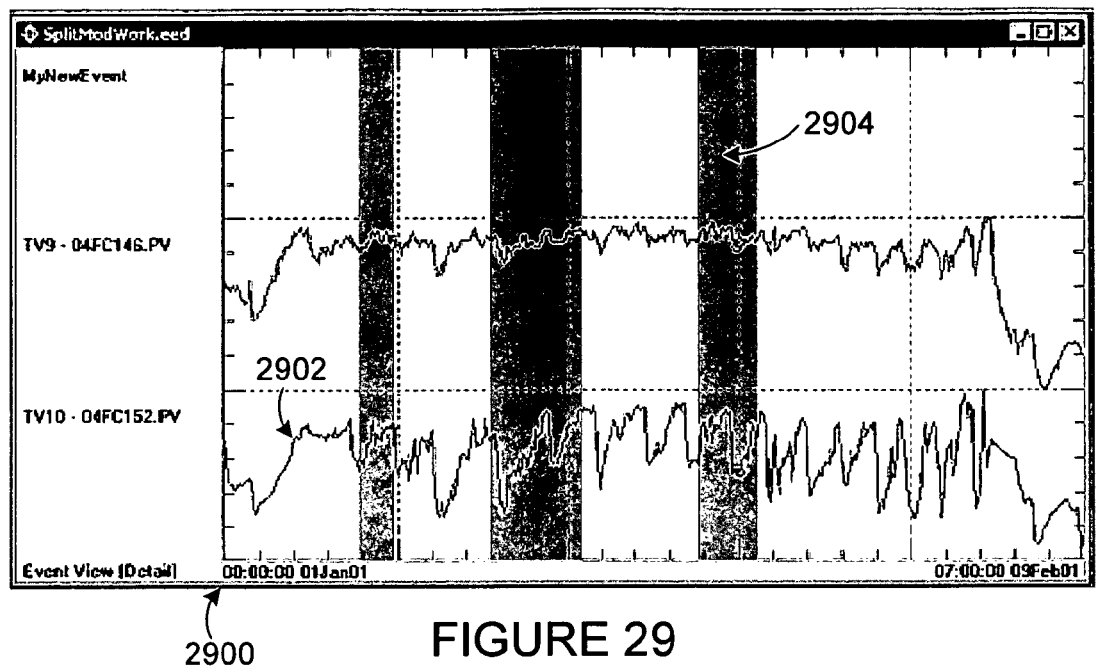

Selection of the "Overview" button 2708 may present the user with a display 2800 as shown in FIG. 28. Here, an event is identified by a bar 2802 in a time plot, and the user can verify whether the start and stop times of the event are correct. Selection of the "Detail" button 2708 may present the user with a display 2900 as shown in FIG. 29. In the display 2900, multiple variables (the ones identified as "key" variables using controls 2706) are plotted as lines 2902. The user can use the mouse as described above to define ranges 2904 that represent pending ranges for new instances of the event. To create actual event instances, the user may select the "Add Event Range(s)" button 2710 in FIG. 27. This may convert the regions 2904 from one format (such as light highlighting) to another format (such as darker bars representing actual event instances). If the user switches back to overview mode as shown in FIG. 28, the display 2800 would show the new event instances defined by the user. In a similar manner, regions 2904 in the display 2900 can be selected and deleted using the "Delete Event Range(s)" button 2710, which would delete the selected event instances. Even when all instances of an event are deleted, the event may remain defined (and therefore listed in the overview display 2800) until the user uses the controls 2704 to delete the event.

Figure 30:
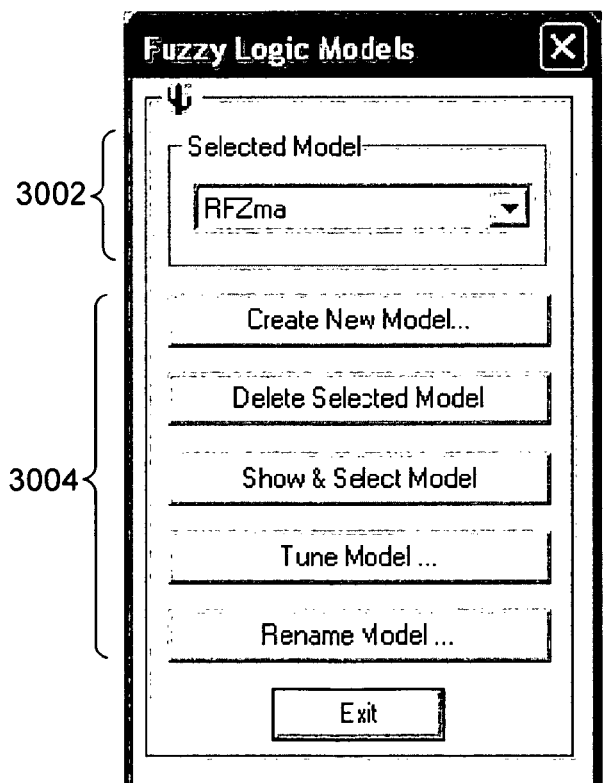

FIGS. 30 through 35 illustrate an example user interface for using the early event detector 130 to create a Fuzzy Logic model for use with one or more PCA models. The creation of a Fuzzy Logic model can be initiated, for example, by selecting the "Create/Train Fuzzy Models" option under the menu 300, the appropriate button in the toolbar 400, or in any other suitable manner. This may present a dialog box 3000 to the user, as shown in FIG. 30. Using the dialog box 3000, the user can select an existing Fuzzy Logic model using a drop-down menu 3002. The user can also select whether to create a new Fuzzy Logic model or delete, rename, or tune an existing Fuzzy Logic model using buttons 3004. A new model could be given a default name and presented in a Fuzzy Logic model view 3100 (shown in FIG. 31), and the new model can then be renamed using the "Rename Model" button 3004 in the dialog box 3000. A new Fuzzy Logic model could also be given a user-defined name at creation. A Fuzzy Logic model can be deleted at any time (before or after tuning). Fuzzy Logic models could be selected using the drop-down menu 3002 or by clicking on the appropriate entry in the Fuzzy Logic model view 3100.

Selection of the "Tune Model" button 3004 in the dialog box 3000 may cause the early event detector 130 to first determine if user-defined event information has been entered. If not, a dialog box may be displayed asking if the user wishes to provide event data. If the user answers "no," the entry of event data may be postponed until later. If the user answers "yes," the user may enter event data as described above.

Figure 32:
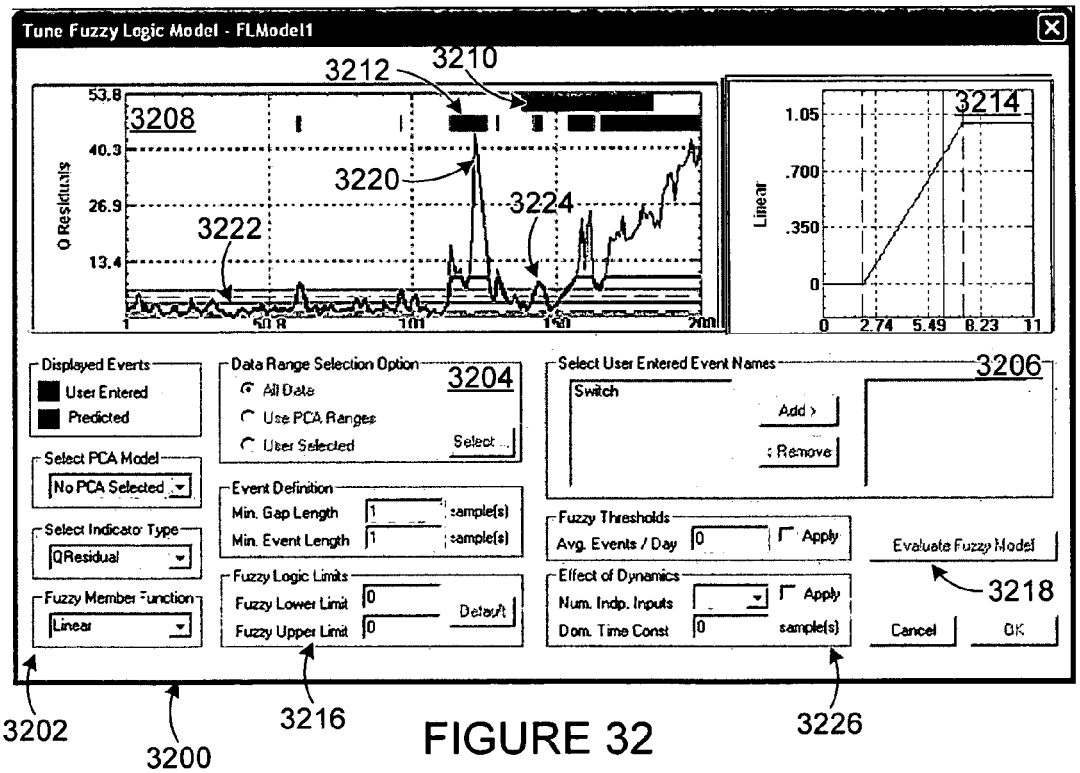

At this point, a dialog box 3200 as shown in FIG. 32 can be presented to the user. Drop-down menus 3202 allow the user to select the PCA model, an indicator type, and a Fuzzy Logic member function for the Fuzzy Logic model being defined. In this example, Fuzzy Logic models can be used as post processors to normalize, shape, and tune the results of one or more PCA models. Normalizing the outputs or output signals of multiple PCA models may allow those outputs to be combined and used further. Each Fuzzy Logic model can be associated with an already-trained PCA model. The "Select PCA Model" drop-down menu 3202 may list the trained PCA models. The "Select Indicator Type" drop-down menu 3202 may identify either a "QResidual" or a "T²Residual" indicator type, and the default indicator type may be "QResidual." The "Fuzzy Member Function" drop-down menu 3202 may be used to select either a "Linear" or a "Sigmoidal" function, and the default member function could be "Linear."

Figure 33:
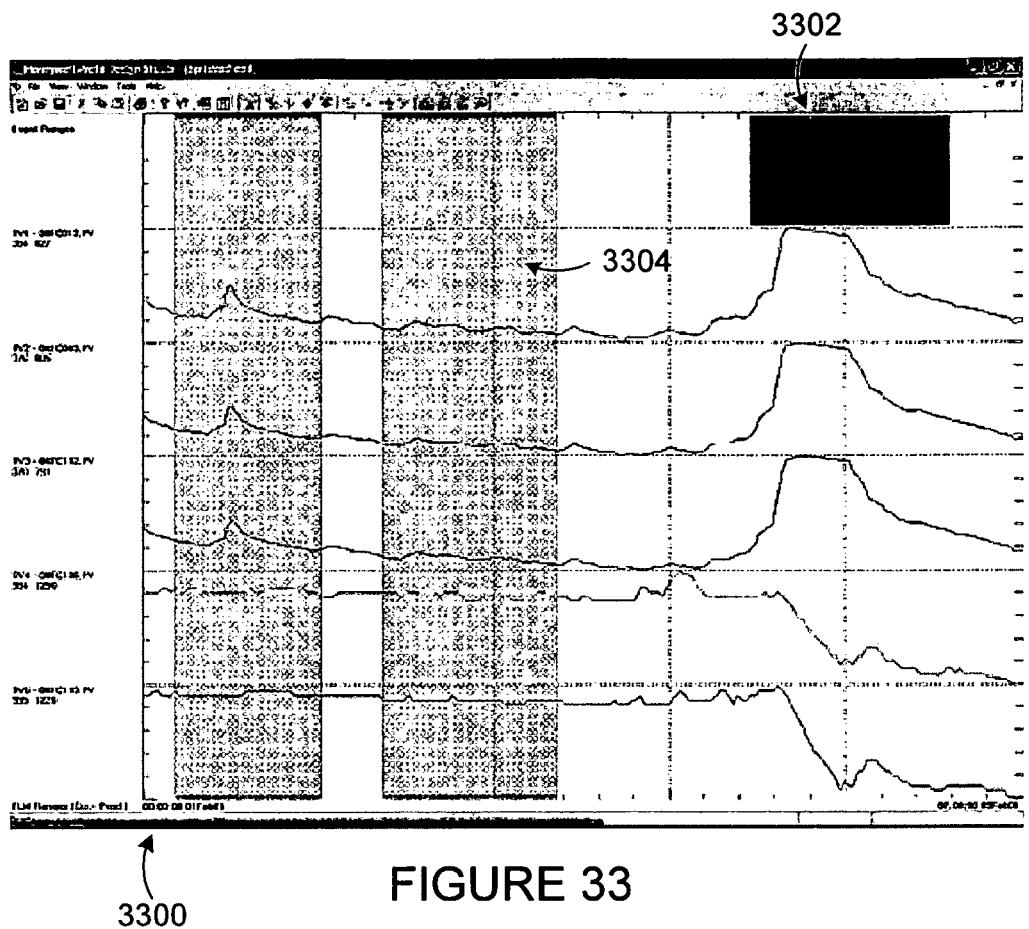

Controls 3204 allow the user to specify the data ranges to be used to tune the Fuzzy Logic model being defined. The user could choose to use all data or the same data ranges identified during creation of the selected PCA model. The user could also choose to define one or more new data ranges. The default may be to use all data. The "Select" button in controls 3204 can be used to view the current data ranges and/or to change or define the data ranges in a dialog box 3300, which is shown in FIG. 33. The dialog box 3300 may be similar to the dialog box 1700 described above with respect to FIGS. 17A through 17C.

In FIG. 33, the number of variables displayed could be limited (such as to five variables). If user event information has been entered, the first row in the dialog box 3300 identifies known events using indicators 3302. Here, the user may be allowed to change the scaling options, zoom options, and plot options. The user can also define data ranges for the Fuzzy Logic model, such as by selecting data ranges to be excluded. By default, all data may be included, and there are no shaded areas in the dialog box 3300. To exclude a range of data, the user may use the mouse as described above to define one or more ranges 3304 selected for exclusion. Multiple excluded ranges 3304 can be defined, and an excluded range 3304 can be re-included. After the range(s) 3304 have been selected, they become pending ranges for the Fuzzy Logic model (since they have not been applied to the model yet). Once the model is tuned, the selected ranges 3304 can be identified, such as by using a different background.

Often times, a Fuzzy Logic model is tuned so that the events it generates match the user-defined events as much as possible. The user may have entered multiple events, and the user can choose one or more events that the Fuzzy Logic model should target using controls 3206 in the dialog box 3200. For example, the user can select an event from the left list in the controls 3206 and click "Add" or select an event from the right list in the controls 3206 and click "Remove." Events in the right list can be identified in a plot 3208, where indicators 3210 identify the user-defined events and indicators 3212 identify events detected using the Fuzzy Logic model. This allows the user to view how well the Fuzzy Logic model as defined is operating during model tuning. A "Fuzzy member function plot" 3214 can also be used to identify the probability of an event occurring.

Figure 34:
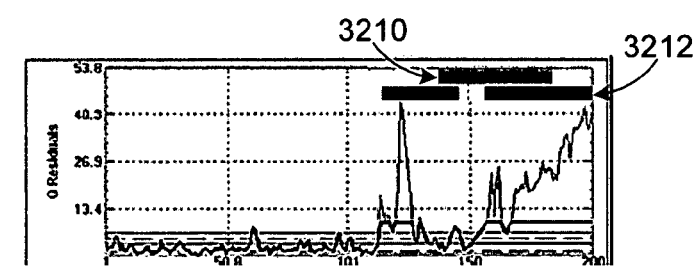

Controls 3216 in the dialog box 3200 allow the user to tune event definition and Fuzzy Logic limits. Once the PCA model, indicator type, and Fuzzy member function have been selected using drop-down menus 3202, the default Fuzzy lower limit and Fuzzy upper limit may be automatically calculated. These limits are used to predict events for the selected data ranges. To eliminate or decrease "chattering" or false events, the user can define a minimum event gap length (the minimum length between events) and a minimum event length (the minimum length of an event) in terms of samples using the controls 3216. The defaults for these lengths may be one sample. Internally, a Fuzzy Logic model may use a digital latch with these two lengths to filter raw predicted events. In the above example, the user may enter 15 and 3 for the minimum gap length and the minimum event length and select an "Evaluate Fuzzy Model" button 3218. The new predicted events in the plot 3208 may appear as shown in FIG. 34, where the indicators 3212 show how the new predicted events have changed.

Figure 35:
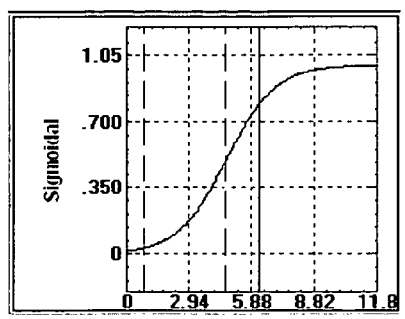

Also, depending on the value selected using the "Fuzzy Member Function" drop-down menu 3202, the plot 3214 may take the form shown in FIG. 32 or the form shown in FIG. 35. The Fuzzy limits and Fuzzy member function determine the shape of the plot 3214. The formula for the linear member function can be expressed as:

$$Y=\min(1,\max(0,(X-LL)/(UL-LL))) \quad (108)$$

and the formula for the Sigmoid member function can be given by:

$$Y=1/(1+e^{-LL*(X-UL)}). \quad (109)$$

Here, X is an indicator value, Y is a probability, LL is a lower limit, and UL is an upper limit. The x-axis in the plot 3214 represents indicator values, and the y-axis represents the probability of an event occurring. If the user moves the mouse to put the cursor inside the plot 3214, the indicator value and corresponding probability value can be shown at the top of the plot 3214. The two dashed lines in the plot 3214 represent the Fuzzy lower limit and Fuzzy upper limit. If the Fuzzy member function is "Linear," the Fuzzy lower limit may correspond to a probability of zero, and the Fuzzy upper limit may correspond to a probability of one. The solid line in the plot 3214 may represent the Fuzzy limit that corresponds to a probability of 0.8. If the member function is "Sigmoid," the Fuzzy upper limit may correspond to a probability of 0.5, and the solid line may represent the Fuzzy limit corresponding to a probability of 0.8. The probability of 0.8 in this example represents the limit for generating raw events before applying the digital latch. If the computed indicator value is greater than this value, an event is flagged. Otherwise, no event is flagged. The same three limits can be plotted in the plot 3208 (although they may be plotted horizontally instead of vertically).

In the plot 3208, the x-axis represents data indexes, and the y-axis represents indicator values. A trend plot 3220 represents the trend for the indicator values calculated from the PCA model for the selected data ranges using the defined Fuzzy Logic model. As noted earlier, the user-defined events and predicted events are shown at the top of the plot 3208. A line 3222 represents the "QLimit" (if the indicator type is QResidual) or "T²Limit" (if the indicator type is T²Residual). A line 3224 represents the trend in the Fuzzy output values generated by applying the Fuzzy member function to the indicator values. The Fuzzy output values in this example are between zero and one, and the Fuzzy output trend has been normalized according to the original indicator values. If the user moves the mouse to put the cursor inside the plot 3208, the time stamp, index, indicator value, indicator limit, and corresponding Fuzzy output may be shown at the top of the plot 3208.

Controls 3216 and 3226 in the dialog box 3200 allow the user to modify the limits of the Fuzzy Logic model. For example, if default Fuzzy limits do not generate events that match the user-defined events well, the user could adjust the Fuzzy limits. The user could adjust the limits by manually entering their values in controls 3216 and clicking the "Evaluate Fuzzy Model" button 3218. At any time, if the user wishes to set the limits back to their defaults, the user may select the "Default" button in the controls 3216 and the "Evaluate Fuzzy Model" button 3218. The user could also adjust the Fuzzy limits by specifying an event threshold and/or an effect of dynamics in controls 3226 to increase the original default limits. This may be useful if there are too many predicted events. The desired event threshold and/or dynamic effect can be entered, and the "Apply" checkbox can be selected for one or both of them. At this point, the "Default" button in controls 3216 and the "Evaluate Fuzzy model" button 3218 can be selected to adjust the Fuzzy limits. If the user enters "0" for average events per day and chooses "Apply" for the "Fuzzy Threshold," the new default Fuzzy limits may generate no events. If the entered average events per day is less than or equal to the original predicted events per day, the Fuzzy threshold may have no effect on the Fuzzy limits. The formula for the "effect of dynamics" correction can be expressed as:

$$\text{dyn\_corr} = \text{num\_indp} * e^{-\frac{1}{\text{dom\_tau}}} * std(indic) \qquad (110)$$

where dyn_corr is the dynamic correction, num_indp is the number of independent inputs, dom¯tau is the dominant time constant, and std(indic) is the standard deviation for the indicators.

Figure 31:
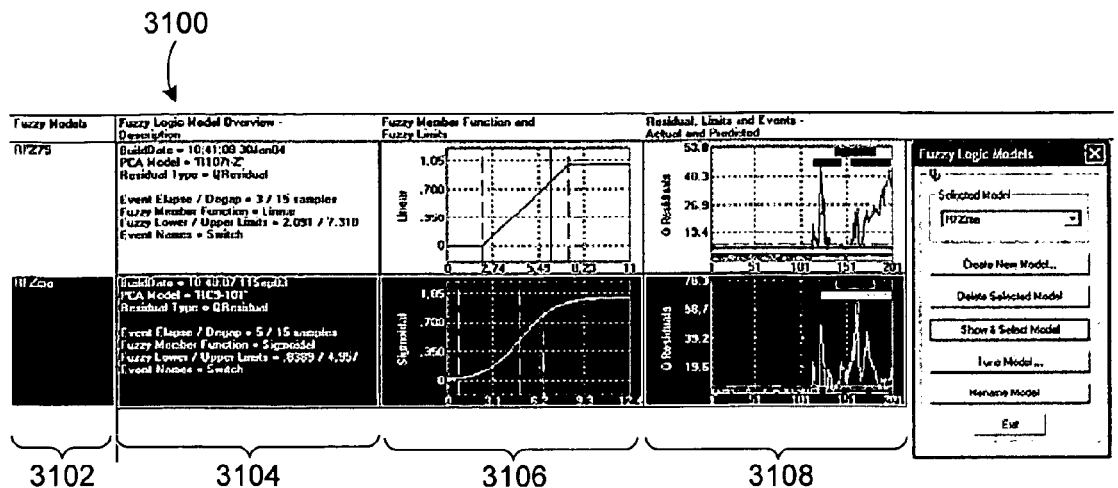

At any time, the user can choose to view one or more Fuzzy Logic model summaries by entering the Fuzzy Logic model view 3100, which was shown in FIG. 31. Here, the number of rows may depend on the number of Fuzzy Logic models. The names of the Fuzzy Logic models are listed in column 3102. Three columns 3104-3108 show detailed information about each Fuzzy Logic model. The column 3104 identifies an overview of the Fuzzy Logic model and could include information such as the model build date and time, the PCA model used, the indicator type, the event definition, the Fuzzy member function, the Fuzzy limits, and the selected user-defined events. The column 3106 graphically identifies the Fuzzy limits and Fuzzy member function. In column 3108, the residual limits and events (actual and predicted) are graphically represented.

Figure 36:
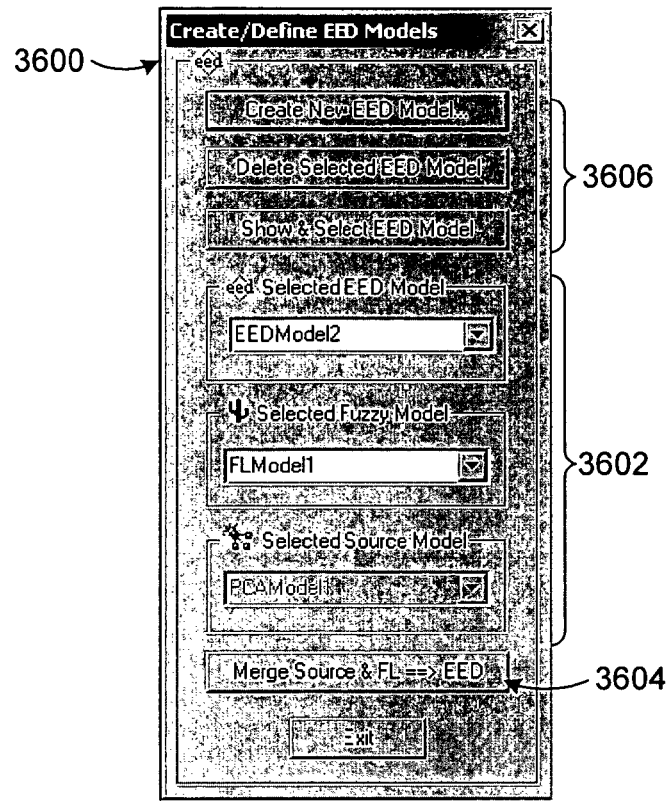

FIGS. 36 through 40 illustrate an example user interface for using the early event detector 130 to build EED models representing PCA model-Fuzzy Logic model combinations. The creation of an EED model can be initiated, for example, by selecting the "Define EED Models" option under the menu 300, the appropriate button in the toolbar 400, or in any other suitable manner. This may present a dialog box 3600 to the user, as shown in FIG. 36. As noted above, an EED model may represent a wrapper that includes a PCA model and a corresponding Fuzzy Logic model. The creation of an EED model may only be necessary if the PCA model-Fuzzy Logic model combination is going to be used with the on-line module of the early event detector 130. This option allows the raw PCA model outputs, as well as the Fuzzy Logic model scaled/filtered outputs, to be made available on-line. Among other things, this process helps to create the connections between the Fuzzy Logic and PCA models that are needed for on-line execution.

The user can use the dialog box 3600 to create, select, view, and delete EED models. Drop-down menus 3602 can be used to select a Fuzzy Logic model or an existing EED model. Since each Fuzzy Logic model incorporates a PCA model, it is not necessary for the user to select the PCA model, and the "Selected Source Model" drop-down menu 3602 may be automatically updated when the user selects a Fuzzy Logic model. The user can use a "Merge Source & FL->EED" button 3304 to merge the Fuzzy Logic model and PCA model identified using the drop-down menus 3304 into an EED model. The user can also use buttons 3606 to create a new EED model, delete an existing EED model, or view an EED model.

Figure 37:
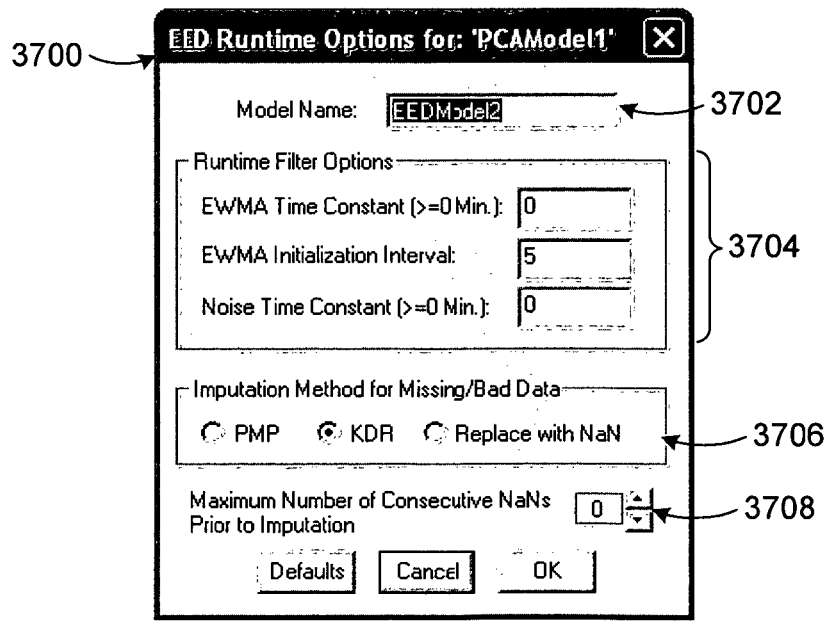

When the user chooses to create an EED model, the user may be presented with a dialog box 3700 as shown in FIG. 37. Using this dialog box 3700, the user can adjust parameters in the EED model without rebuilding the Fuzzy Logic and PCA models. For example, the user could adjust the name of the EED model in text box 3702. The user could also adjust the EWMA time constant, the EWMA initialization interval, and the noise time constant using controls 3704. In addition, the user could adjust the method for imputing bad or missing data using controls 3706 and the maximum number of consecutive bad/missing data elements required before imputation is invoked using controls 3708.

Figure 38:
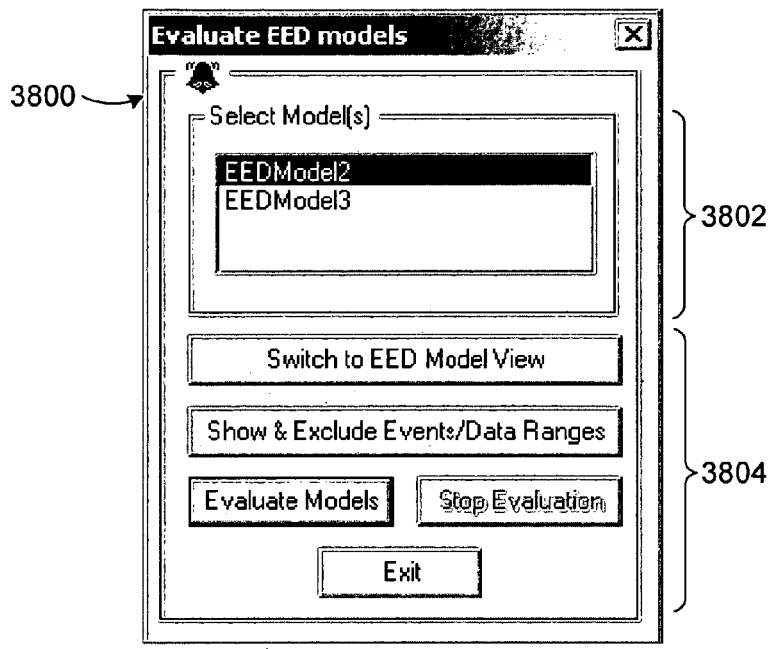
Figure 39A:
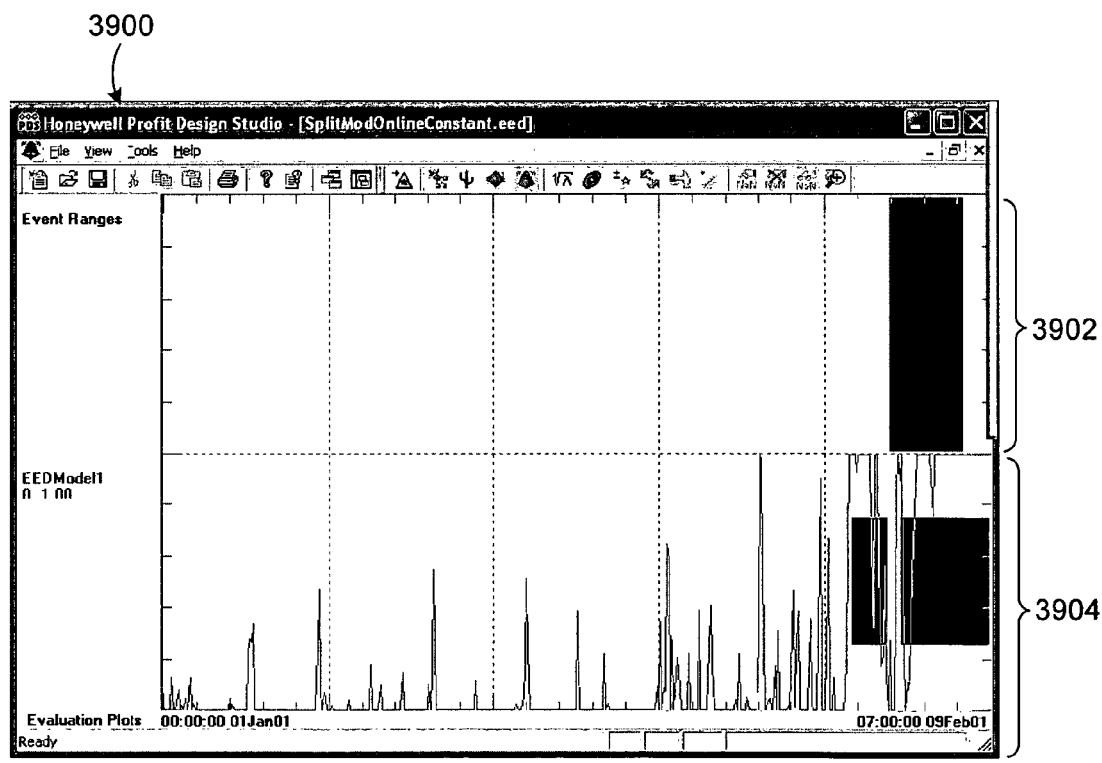

The user can also evaluate an EED model as if the model was running in a runtime environment. This could represent the final validation step for the EED model and may help to ensure that the user understands what is downloaded to the runtime environment. This step may not provide any new analysis, and it may be unnecessary unless the user plans to take the EED model on-line. The user could initiate evaluation of an EED model by selecting the "Evaluate EED Model" option in the menu 300 or in any other suitable manner. This may present the user with a dialog box 3800, which is shown in FIG. 38. In the dialog box 3800, the user can select which EED model(s) to evaluate using a list 3802. Buttons 3804 can then be selected to invoke particular functions. For example, selecting the "Evaluate Models" button 3804 may execute the selected EED model(s) over an entire data set. The results can be presented as shown in FIG. 39A, where a graph 3900 has user-defined events in an upper plot 3902 and the scaled output of the EED model (along with any detected abnormalities) in a lower plot 3904.

Figure 39B:
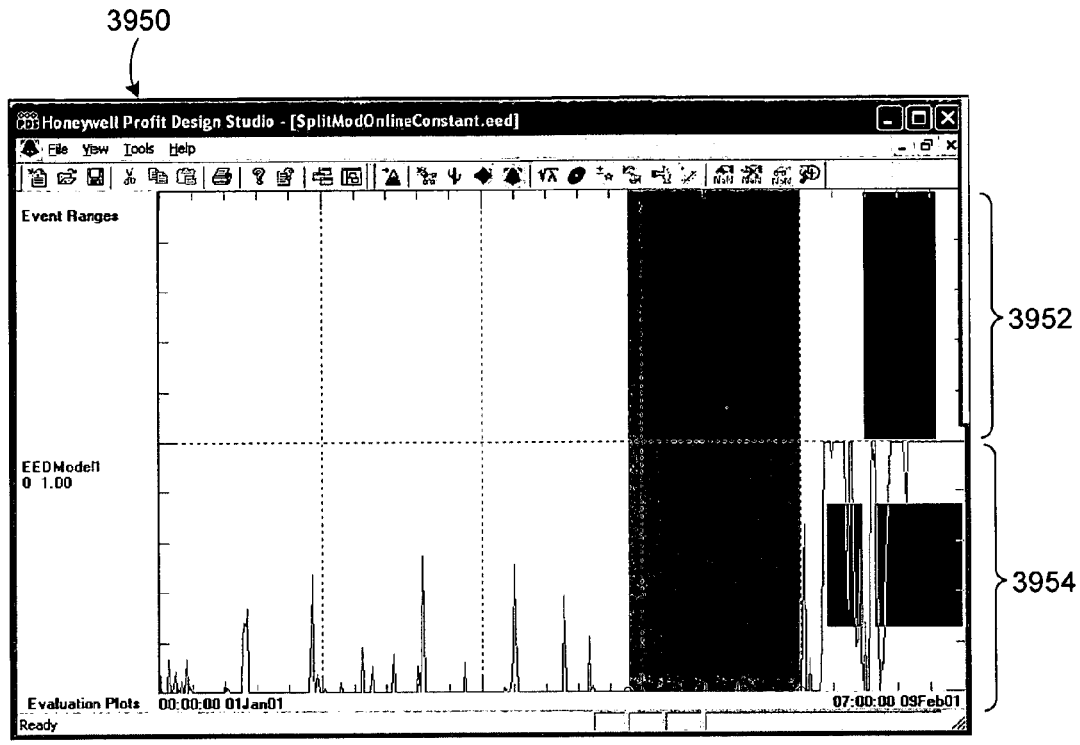

The user can also select a "Show & Exclude Events/Data Ranges" button 3804 in the dialog box 3800. As with the prior range exclusion techniques described above, this allows the user to exclude or include specific data ranges or events for use in evaluating an EED model. By selecting a data range and then selecting the "Evaluate Models" button 3804, the selected EED model is executed over its data set without considering any excluded ranges or events. Example results from this evaluation are shown in FIG. 39B, where a graph 3950 includes plots 3952 and 3954. An excluded data range is highlighted in the graph 3950, and the EED model output in the plot 3954 is zero in the excluded range.

Figure 40:
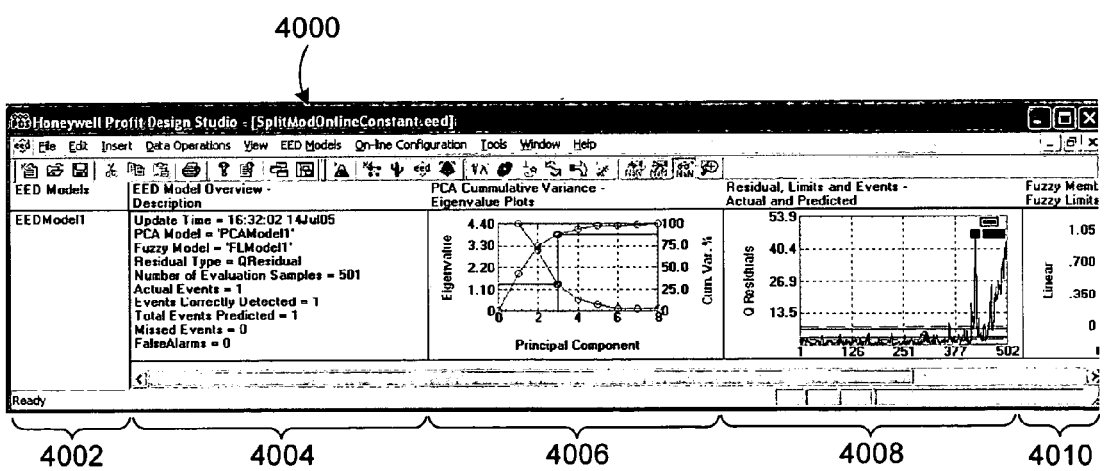

When dealing with EED models, the user may enter an EED model view that combines the runtime configuration, PCA model, and Fuzzy Logic model for each EED. An example EED model view 4000 is shown in FIG. 40. The first column 4002 identifies the names of one or more EED models available for selection. The second column 4004 contains a summary or overview of an EED model, along with any adjustable on-line parameters. In this example, column 4004 identifies when the EED model was created, the PCA and Fuzzy Logic models associated with the EED model, the statistic used in the post processing Fuzzy Logic model, and the number of samples in the data set used to evaluate the EED model. The column 4004 also identifies the number of annotated events in the evaluation data, the number of events that were detected using the EED model, the total number of events predicted using the output of the EED model, any annotated events that were missed by the EED model, and any events claimed by the EED model that were not annotated. Clicking on the second column 4004 of any EED model in the view 4000 may present the user with the dialog box 3700 shown in FIG. 37.

The third column 4006 of the view 4000 presents a summary of the PCA cumulative variance, which shows the eigenvalue and cumulative variance per eigenvalue plots. The fourth column 4008 contains a summary of the actual and predicted events for the EED model. The plot in column 4008 shows the raw statistic (Q or $T^2$) used for the EED model, the upper and lower limits for the Fuzzy Logic model, and the 95% or other confidence limit for the selected residual. The final column 4010 (which is partially shown) shows the Fuzzy member function used in the Fuzzy Logic model and the limits associated with the Fuzzy Logic model. This plot may be the same as or similar to one of the Fuzzy member function plots shown in FIGS. 32 and 35.

Figure 41:
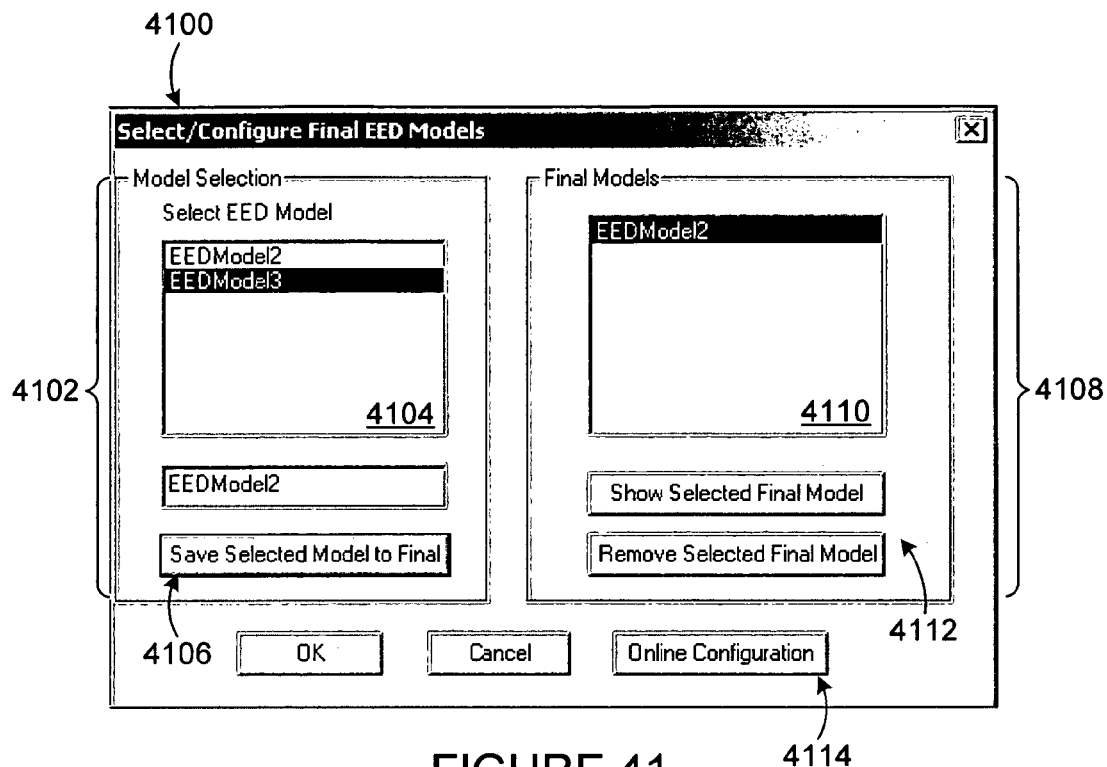
Figure 42:
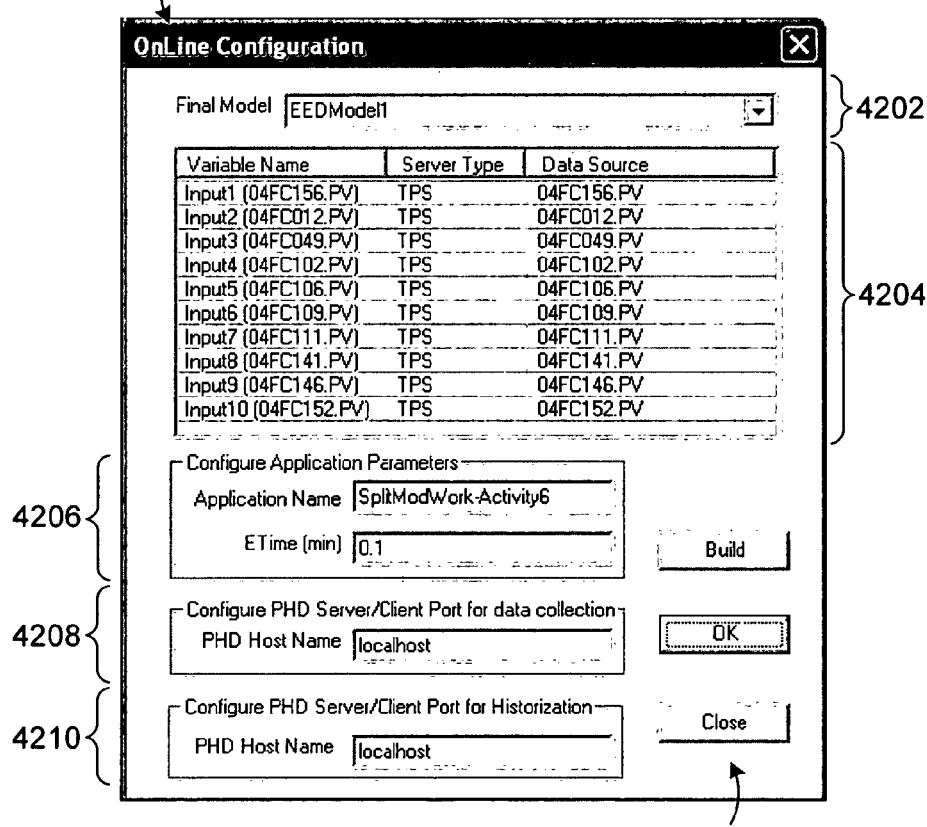
Figure 43:
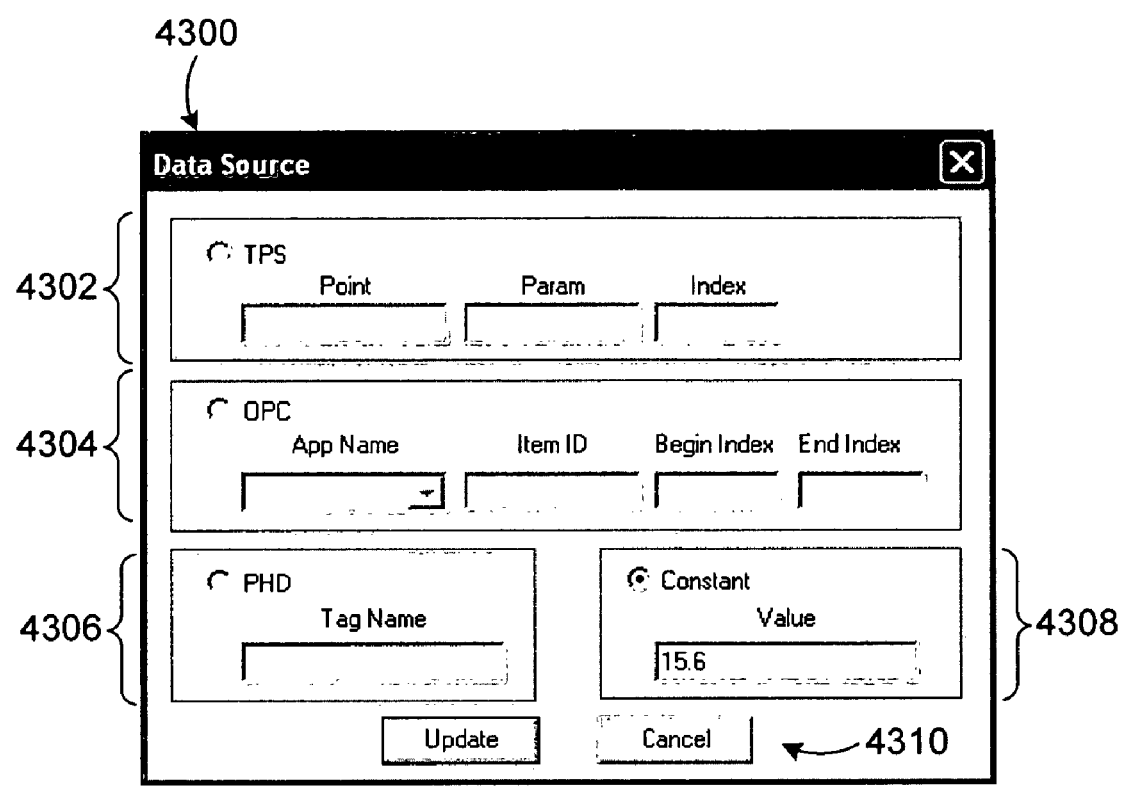

FIGS. 41 through 43 illustrate an example user interface for using the early event detector 130 to select and configure an EED model for on-line use. The configuration of an EED model can be initiated, for example, by selecting the "Select/Configure Final Models" option under the menu 300 or in any other suitable manner. This may present a dialog box 4100 to the user, as shown in FIG. 41. In FIG. 41, the dialog box 4100 includes selection controls 4102, which include a list 4104 of EED models available for selection and a button 4106. The dialog box 4100 also includes final model controls 4108, which include a list 4110 of selected EED models and various buttons 4112. One or more EED models can be selected for configuration by highlighting the model(s) in the list 4104 and selecting the button 4106. This transfers the selected model(s) from the list 4104 to the list 4110. Buttons 4112 can be used to view details of a selected model in the list 4110 and to move a selected model in the list 4110 back to the list 4104.

Selection of an "Online Configuration" button 4114 can initiate configuration of the EED model(s) contained in the list 4110. At this point, the user can configure the EED model(s) to run on-line. This can include specifying a data source for each variable, an application name, an execution time, and connections to "historize" or archive the model outputs. For example, selection of the "Online Configuration" button 4114 could present the user with a dialog box 4200 shown in FIG. 42. A drop-down menu 4202 allows the user to select one of the EED models identified in the list 4110 of the dialog box 4100. For the selected EED model, a parameter list 4204 identifies the variables in the selected model by name, type, and data source. Text boxes 4206 allow the user to define the application name and execution time (in minutes) of the selected EED model. The application name could be appended to all embedded history configuration items that are archived to an embedded Process History Database (PHD) or other file. The application name might therefore represent a short string or other suitable value. A network edit box 4208 allows the user to define the name or network address (such as an IP address) of a device where input data can be accessed (such as a data collection PHD server if PHD input is configured for any variables). A network edit box 4210 allows the user to define the name or network address where embedded history data is stored. If an embedded PHD file is used to store data for the EED model, the edit box 4210 may remain set to "localhost."

Individual variables can be selected from the parameter list 4204, such as by double clicking an individual entry in the list 4204. This may present the user with a dialog box 4300 as shown in FIG. 43. The dialog box 4300 allows the user to specify the data source for a selected variable. In this example, three options are provided for "live" connections, along with a fourth option for specifying a constant data value. Data source definition areas 4302-4306 can be used to specify that the data source for a variable is a TOTAL PLANT SOLUTION (TPS), OLE for Process Control (OPC), or PHD source. Data source definition area 4308 allows the user to specify a constant value for a variable. Constant values can be useful for initial testing of an EED model because it eliminates the uncertainty of connecting to an external data source. Each point in a model can be set independently, such as by taking a single point snapshot of normal data and entering those values into the constant fields for initial testing.

The user can select one of the data source definition areas 4302-4308 using the radio button in that area. The user can then fill in the text box(es) in that area to complete the data source definition. Selecting the "TPS" button in area 4302 may allow the user to define the TPS Local Control Network (LCN) data source for the selected variable. The user can also enter the point name, parameter, and index (if applicable) for the LCN tag. Similarly, selecting the "PHD" button in area 4306 may allow the user to specify that the data source for the variable is a PHD server tag. In this case, the EED configuration file may be built with the new data source, and it may be the user's responsibility to build the PHD tag. Also, if the PHD server is located on a different node in the system 100, the user may specify the node name where the PHD server resides as part of the configuration file.

The "OPC" button in area 4304 allows the user to specify data exchange with an OPC server. The OPC server can be any OPC server, such as a TOTAL PLANT NETWORK (TPN) server for HONEYWELL TPN access or a third-party product for accessing third-party data. The "App Name" field identifies the OPC server to communicate with, which is often given in the documentation accompanying the OPC server. As another example, the dcomcnfg.exe application provided with MICROSOFT WINDOWS platforms may be used to discover the "Prog Id" of the OPC server. This application lists out the "Prog Ids" for all Distributed Component Object Model (DCOM) servers registered on the local platform, and the list may include all servers (not just OPC servers). To see a list of only OPC servers, the user could run MATRIKON's OPC EXPLORER. The "Item ID" field can be set to the "OPC Item ID" by which the OPC server given in "App Name" identifies the data point that the user wishes to read or write. The layout of the "OPC Item ID" may be different for different OPC servers.

Once the on-line parameters have been defined, the final off-line step is to build the on-line configuration files. This step may generate a set of files that are used by the on-line module of the early event detector 130 to instantiate the EED application and all models included in the EED application. An on-line EED application may include one or more EED models.

The generation of the on-line configuration files can be invoked, for example, by selecting the "Build" button 4212 in the dialog box 4200. The generation of the configuration files may begin, and the user can view a message window identifying when various configuration and history files have been written. At this point, the model configuration files can be examined. The files could be stored in a default folder or in a location specified by the user. For each EED application, the following files may be generated:

ApplicationName.cfg: contains the application input/output configuration;

ApplicationName.csv: contains the Embedded History configuration;

ApplicationName.xml: contains overall application details; and

ApplicationName_ModelName.xml: contains the PCA and Fuzzy Logic model configuration details.

At this point, the user can make the EED model available to the on-line module of the early event detector 130 for execution on-line. Further, the user-selected options in the EED model design can be exported as a "User Options Summary" report. In some embodiments, this report can be exported in text and/or XML format. To export the report, the "Export User Option Summary" option can be selected under "Tools" in the menu 300. In a dialog box, the user can select the folder where the report is to be saved and specify the file name and the report format type. Different messages could be presented to the user upon completion of the report storage, depending on the format of the report.

An EED model could be made available for on-line use in any suitable manner. For example, the EED model could be placed on a single computing device or node or distributed across multiple computing devices or nodes. Once an EED model has been made available for on-line use, the EED model can be used to perform event prediction. During on-line operation, the EED model may appear or be presented in the same manner it appeared or was presented during design. For example, displays presented to users could be identical or similar to the displays presented to users during the design of the PCA, Fuzzy Logic, and EED models. Individual components of the displays could also be individually configured and presented in a runtime display. Also, a master "yoking" control could be tied to or control multiple graphical controls presented to users in one or multiple displays. Further, one or more tools can be provided for viewing, extracting, and visualizing data associated with on-line use of the EED model, whether that data is historical in nature or currently being used by the EED model. In addition, when a computing device or node fails (such as due to a power interruption), the EED model can be automatically restarted upon restoration of the device or node.

Although FIGS. 3 through 43 illustrate one example of a tool for early event detection, various changes may be made to any of these figures. For example, while specific input and output mechanisms (such as a mouse, keyboard, dialog boxes, windows, and other I/O devices) are described above, any other or additional I/O technique could be used to receive input from or provide output to one or more users.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:

receiving operating data associated with an industrial process at an early event detector;

generating a first model and a second model using a first training set of the operating data, the first model generated by producing a first Principal Component Analysis (PCA) model and reducing a number of principal components in the first PCA model, the second model generated by adjusting a membership function and a digital latch associated with a Fuzzy Logic model, the first training set comprising operating data associated with normal operation of the industrial process;

forming an early event detection (EED) model using the first and second models;

validating at least one of the first model and the EED model by generating a third model and comparing operation of at least one of the first model and the EED model to operation of the third model, the third model comprising a second PCA model generated using a second training set of the operating data, the second training set comprising operating data associated with normal operation of the industrial process distinct from the first training set;

using the EED model to predict one or more events associated with the industrial process, the one or more events associated with one or more abnormal conditions in the industrial process, the one or more events predicted by:
generating one or more initial event predictions using current operating data associated with the industrial process and the first model; and
adjusting the one or more initial event predictions by at least one of: normalizing, shaping, and tuning an output of the first model using the second model; and generating one or more notifications identifying the one or more predicted events.

2. The method of claim 1, further comprising:

identifying at least one invalid data element in the current operating data;

estimating a value for one or more of the invalid data elements using at least some valid data elements in the current operating data, wherein the estimating comprises performing a rank revealing OR factorization of a 2-norm known data regression problem; and using the estimated value for one or more of the invalid data elements to generate the one or more initial event predictions.

3. The method of claim 1, further comprising:
presenting a graphical display to a user; and
receiving from the user an identification of the first and second training sets and parameter values for tuning the first and second models.

4. The method of claim 1, further comprising:
presenting a graphical display to a user; and
receiving from the user an identification of a plurality of first events associated with the industrial process;
wherein validating at least one of the first model and the EED model comprises determining whether second events identified using the EED model match the first events.

5. The method of claim 1, wherein generating the first model further comprises refining the first PCA model while keeping a percentage of time that at least one statistic exceeds its statistical limit below a threshold, the statistic comprising at least one of a Q statistic and a $T^2$ statistic associated with the first PCA model.

6. The method of claim 1, wherein generating the first and second models further comprises:
defining a filter for dynamically adjusting a mean value associated with an input variable; and
defining a mode switch for modifying, based on transitions in the input variable, one or more characteristics of the filter to provide slower or faster response.

7. An apparatus comprising:
at least one memory configured to store operating data associated with an industrial process; and
at least one processor configured to:
generate a first model and a second model using a first training set of the operating data, the at least one processor configured to generate the first model by producing a first Principal Component Analysis (PCA) model and reducing a number of principal components in the first PCA model, the at least one processor configured to generate the second model by adjusting a membership function and a digital latch associated with a Fuzzy Logic model, the first training set comprising operating data associated with normal operation of the industrial process;
form an early event detection (EED) model using the first and second models;
validate at least one of the first model and the EED model by generating a third model and comparing operation of at least one of the first model and the EED model to operation of the third model, the third model comprising a second PCA model, the at least one processor configured to generate the second PCA model using a second training set of the operating data, the second training set comprising operating data associated with normal operation of the industrial process distinct from the first training set;
use the EED model to predict one or more events associated with the industrial process, the one or more events associated with one or more abnormal conditions in the industrial process, the at least one processor configured to predict the one or more events by:
generating one or more initial event predictions using current operating data associated with the industrial process and the first model; and
adjust the one or more initial event predictions by at least one of: normalizing, shaping, and tuning an output of the first model using the second model; and
generate one or more notifications identifying the one or more predicted events.

8. The apparatus of claim 7, wherein the at least one processor is further configured to:
identify at least one invalid data element in the current operating data;
estimate a value for one or more of the invalid data elements using at least some valid data elements in the current operating data, wherein the at least one processor is configured to estimate the value for the one or more invalid data elements by performing a rank revealing QR factorization of a 2-norm known data regression problem; and
use the estimated value for one or more of the invalid data elements to generate the one or more initial event predictions.

9. The apparatus of claim 7, wherein the at least one processor is further configured to:
present a graphical display to a user; and
receive from the user an identification of the first and second training sets and parameter values for tuning the first and second models.

10. The apparatus of claim 7, wherein the at least one processor is further configured to:
present a graphical display to a user; and
receive from the user an identification of a plurality of first events associated with the industrial process;
wherein the at least one processor is configured to validate at least one of the first model and the EED model by determining whether second events identified using the EED model match the first events.

11. The apparatus of claim 7, wherein the at least one processor is configured to generate the first model by refining the first PCA model while keeping a percentage of time that at least one statistic exceeds its statistical limit below a threshold, the statistic comprising at least one of a Q statistic and a $T^2$ statistic associated with the first PCA model.

12. The apparatus of claim 7, wherein the at least one processor is configured to provide:
a filler for dynamically adjusting a mean value associated with an input variable; and
a mode switch for modifying, based on transitions in the input variable, one or more characteristics of the filter to provide slower or faster response.

13. A tangible computer-readable medium embodying a computer program, the computer program comprising computer readable program code for:
receiving operating data associated with an industrial process;
generating a first model and a second model using a first training set of the operating data, the first model generated by producing a first Principal Component Analysis (PCA) model and reducing a number of principal components in the first PCA model, the second model generated by adjusting a membership function and a digital latch associated with a Fuzzy Logic model, the first training set comprising operating data associated with normal operation of the industrial process;
forming an early event detection (BED) model using the first and second models;
validating at least one of the first model and the EED model by generating a third model and comparing operation of at least one of the first model and the EED model to operation of the third model, the third model comprising a second PCA model generated using a second training set of the operating data, the second training set comprising operating data associated with normal operation of the industrial process distinct from the first training set;

using the EED model to predict one or more events associated with the industrial process, the one or more events associated with one or more abnormal conditions in the industrial process, the one or more events predicted by:
  generating one or more initial event predictions using current operating data associated with the industrial process and the first model; and
  adjusting the one or more initial event predictions by at least one of: normalizing, shaping, and tuning an output of the first model using the second model; and
generating one or more notifications identifying the one or more predicted events.

14. The computer-readable medium of claim 13, further comprising computer readable program code for:
  identifying at least one invalid data element in the current operating data;
  estimating a value for one or more of the invalid data elements using at least some valid data elements in the current operating data, wherein the estimating comprises performing a rank revealing QR factorization of a 2-norm known data regression problem; and
  using the estimated value for one or more of the invalid data elements to generate the one or more initial event predictions.

15. The computer-readable medium of claim 13, further comprising computer readable program code for:
  presenting a graphical display to a user; and
  receiving from the user an identification of the first and second training sets and parameter values for tuning the first and second models.

16. The computer-readable medium of claim 13, further comprising computer readable program code for:
  presenting a graphical display to a user; and
  receiving from the user an identification of a plurality of first events associated with the industrial process;
  wherein the computer readable program code for validating at least one of the first model and the EED model comprises computer readable program code for determining whether second events identified using the EED model match the first events.

17. The computer-readable medium of claim 13, wherein the computer readable program code for generating the first model comprises computer readable program code for refining the first PCA model while keeping a percentage of time that at least one statistic exceeds its statistical limit below a threshold, the statistic comprising at least one of a Q statistic and a $T^2$ statistic associated with the first PCA model.

18. The computer-readable medium of claim 13, wherein the computer readable program code for generating the first and second models further comprises computer readable program code for:
  defining a filter for dynamically adjusting a mean value associated with an input variable; and
  defining a mode switch for modifying, based on transitions in the input variable, one or more characteristics of the filter to provide slower or faster response.

19. A system comprising:
  a plurality of controllers each configured to generate output data for controlling one or more actuators associated with an industrial process using input data from one or more sensors; and
  an early event detector configured to:
    receive operating data comprising at least some of the input or output data;
    generate a first model and a second model using a first training set of the operating data, the early event detector configured to generate the first model by producing a first Principal Component Analysis (PCA) model and reducing a number of principal components in the first PCA model, the early event detector configured to generate the second model by adjusting a membership function ad a digital latch associated with a Fuzzy Logic model, the first training set comprising operating data associated with normal operation of the industrial process;
    form a early event detection (EED) model using the first ad second models;
    validate at least one of the first model ad the EED model by generating a third model and comparing operation of at least one of the first model ad the EED model to operation of the third model, the third model comprising a second PCA model, the early event detector configured to generate the second PCA model using a second training set of the operating data, the second training set comprising operating data associated with normal operation of the industrial process distinct from the first training set;
    use the EED model to predict one or more events associated with the industrial process, the one or more events associated with one or more abnormal conditions in the industrial process, the one or more events predicted by:
      generating one or more initial event predictions using current operating data associated with the industrial process and the first model; and
      adjusting the one or more initial event predictions by at least one of: normalizing, shaping, and tuning an output of the first model using the second model; and
    generate one or more notifications identifying the one or more predicted events.

20. The system of claim 19, wherein the early event detector is configured to generate the first model by refining the first PCA model while keeping a percentage of time that at least one statistic exceeds its statistical limit below a threshold, the statistic comprising at least one of a Q statistic and a $T^2$ statistic associated with the first PCA model.

21. The system of claim 19, wherein the early event detector is configured to provide:
  a filter for dynamically adjusting a mean value associated with an input variable; and
  a mode switch for modifying, based on transitions in the input variable, one or more characteristics of the filter to provide slower or faster response.

* * * * *